US010019559B2

(12) United States Patent
Gehring et al.

(10) Patent No.: US 10,019,559 B2
(45) Date of Patent: Jul. 10, 2018

(54) METHOD, SYSTEM AND DEVICE FOR AGGREGATING DATA TO PROVIDE A DISPLAY IN A USER INTERFACE

(71) Applicant: Accenture Global Services Limited, Dublin (IE)

(72) Inventors: Sjoerd Gehring, New York, NY (US); Thomas Dziekan, Joliet, IL (US); Hari Ganapathy, Naperville, IL (US); Leandro Cartelli, Buenos Aires (AR)

(73) Assignee: Accenture Global Services Limited, Dublin (IE)

( * ) Notice: Subject to any disclaimer, the term of this patent is extended or adjusted under 35 U.S.C. 154(b) by 289 days.

(21) Appl. No.: 14/808,217

(22) Filed: Jul. 24, 2015

(65) Prior Publication Data

US 2016/0026347 A1    Jan. 28, 2016

Related U.S. Application Data

(60) Provisional application No. 62/029,331, filed on Jul. 25, 2014.

(51) Int. Cl.
| | |
|---|---|
| *G06F 3/0482* | (2013.01) |
| *G06F 21/31* | (2013.01) |
| *G06F 21/33* | (2013.01) |
| *G06Q 10/10* | (2012.01) |
| *G06Q 10/06* | (2012.01) |

(52) U.S. Cl.
CPC ............ *G06F 21/31* (2013.01); *G06F 3/0482* (2013.01); *G06F 21/335* (2013.01); *G06Q 10/06* (2013.01); *G06Q 10/1053* (2013.01); *G06F 2221/2101* (2013.01)

(58) Field of Classification Search
CPC ...... G06F 3/0482; G06F 21/31; G06F 21/335; G06F 2221/2101; G06F 10/1053; G06Q 10/06
See application file for complete search history.

(56) References Cited

U.S. PATENT DOCUMENTS

| | | | |
|---|---|---|---|
| 7,188,074 B2 | 3/2007 | Younger | |
| 9,727,827 B2 | 8/2017 | Hyder et al. | |
| 2003/0195868 A1* | 10/2003 | Wilson | G06Q 40/02 |
| 2006/0026122 A1* | 2/2006 | Hurwood | G06Q 10/10 |
| 2008/0109401 A1* | 5/2008 | Sareen | G06F 17/30864 |

(Continued)

*Primary Examiner* — Aaron Lowenberger
(74) *Attorney, Agent, or Firm* — Brinks Gilson & Lione

(57) ABSTRACT

A method, a system and a device are provided for aggregating data to provide a display in a user interface. The method includes populating data records in data storage of a data management system; authenticating a user; retrieving a list from the data records and displaying the list for the authenticated user; selecting an item from the list through the user interface; receiving an item authentication token associating with the authenticated user; retrieving the plurality of attributes for the item authentication token and a progress status of the object history record; and in response to receiving a user selection, providing a text input field on the display for receiving a user's text inquiry; determining a numerical figure for the authenticated user; and aggregating data for displaying the plurality of attributes, displaying the progress status and determining the numerical figure for the authenticated user.

20 Claims, 21 Drawing Sheets

(56) References Cited

U.S. PATENT DOCUMENTS

| | | | |
|---|---|---|---|
| 2011/0010431 A1* | 1/2011 | Rooks | G06F 17/3002 709/218 |
| 2013/0046704 A1* | 2/2013 | Patwa | G06Q 10/06 705/321 |
| 2014/0081884 A1 | 3/2014 | Govindaraman et al. | |

* cited by examiner

High Performance Delivered

Job Results (57)

Find a Job: 🔍 SAP    [Search]    Manage Saved Alerts (2)

| Country: | clear | City | clear | Workforce | clear | Level | clear |
|---|---|---|---|---|---|---|---|
| All ▼ | | All ▼ | | Solutions ▼ | | 8 ▼ | |

💾 Save search as an alert

Showing 1-15 of 57 results — 910

920

View ☰ ⬛

| | Job Title | Country | City | Workforce | Level | |
|---|---|---|---|---|---|---|
| ⋏ | 📄 💬 in ✉ Close × | | | | | |
| ⋏ | SAP HANA (***) | ⊙ India | Bangalore | Solutions | 8 | Refer |
| ⋏ | SAP-ABAP Object Oriented Development | ⊕ United Kingdom | Bangalore | Solutions | 8 | Refer |
| ⋏ | SAP-SEM Business Planning & Consolidation (BPC) | ⊖ Germany | Bangalore | Solutions | 8 | Refer |
| ⋏ | SAP-Public Sector-Social Services Management | ⊕ United Arab Emirates | Bangalore | Solutions | 8 | Refer |
| ⋏ | SAP-CO-Controlling | ⊕ USA | Bangalore | Solutions | 8 | Refer |
| ⋏ | SAP-SD-Professionals | ⊙ India | Bangalore | Solutions | 8 | Refer |
| ⋏ | | ⊕ United Kingdom | Bangalore | Solutions | 8 | Refer |

Refer your candidate in a few easy steps

The Opportunity
Projektleiter/Berater Online-Strategie/-Marketing in Pharmazie - und Medizintechnikunter Note: All fields marked (*) are mandatory  1104

About You

First Name *
John

Last Name *
Doe

Accenture e-mail*
John@doe.com

Personnel #*
1234567

About your referral

Email *
testing123@testing123.com    Change Referral

First Name *          Last Name *

Country*             State / Province *          City / Region *
Select Country ▶     Select Province ▶           Select Region ▶

Tell us why you think your referral would be a good fit with Accenture? *

Did your referral agree to provide their CV to Accenture? *
⦿ Yes  ○ No
Attach a resume or use a LinkedIn profile
?
                      Browse...        or    in | Refer with LinkedIn    Refer Add another file
Comments regarding your attachments

Have Questions?       Your bonus              Go mobile with the referral app
Contact    Or             Find out what your bonus    Get referring straight
Taryn      FAQ's          could be if you successfully from your mobile
Lujan Gambina Need Help?  refer someone.              phone right now
                          Calculate my bonus          Find out how

METHOD, SYSTEM AND DEVICE FOR AGGREGATING DATA TO PROVIDE A DISPLAY IN A USER INTERFACE

CROSS-REFERENCE TO RELATED APPLICATIONS

This application claims the benefit of U.S. Provisional Application 62/029,331, filed on Jul. 25, 2014, which is hereby incorporated by reference in its entirety.

FIELD OF THE TECHNOLOGY

The invention relates to the field of systems integration technology, and more particularly, it relates to a method, a system and a device for aggregating data to display employee referral information in the user interface on the user terminal.

BACKGROUND OF THE TECHNOLOGY

Systems integration is a process to link different computing components and software programs together either physically or functionally. As a result of that, the systems function as a whole. After an employee in a company makes a referral of a job candidate for hiring as a new employee and the new employee is hired, often, the employee will be paid a referral bonus. However, when the company is large and the number of employee referrals is high, it can be very time consuming for a human resource professional to collect the referral requests and the data from different computing components of the company's enterprise system to track the status of an employee referral and provide that status to the employees making the referrals. In automating such a process, there are technical problems to overcome in aggregating data from disparate systems with data in different formats, often from systems in different countries and different applications, and providing the data to be displayed in a consistent aggregated and formatted manner to employees with a minimum use of enterprise bandwidth and minimum technical support.

SUMMARY

Examples of the present disclosure provide at least a method, a system and a device for aggregating data to provide a display in a user interface. The method, the user terminal device and the system may be directed to collect, analyze and display data for the employee referral information. Examples of the present disclosure provide the following technical solutions:

A method may be provided for aggregating data to provide a display in a user interface. The method may include the steps of populating data records in data storage of a data management system, authenticating a user for accessing the data records stored in the data management system, retrieving a list from the data records in the data storage and presenting for display the list in the user interface for the authenticated user, receiving a selection of an item from the list through the user interface, and in response to the selection, presenting for display on the user interface an item attribute and an item figure for the selected item, and receiving, from the user interface, an item authentication token associating with the authenticated user for the selected item and creating in the data storage an object history record containing a plurality of attributes for the item authentication token.

Also, the method may further include: updating the data records stored in the data storage periodically at a pre-determined time interval by connecting with an external system that stores and processes data associated with a plurality of statuses for the item authentication token, including a result status for the item authentication token, retrieving the plurality of attributes for the item authentication token from the data records stored in the data storage, and presenting for display the plurality of attributes in the user interface of a user terminal, and retrieving a progress status of the object history record from the data storage where the progress status is one of a plurality of pre-determined statuses that indicate a progress of the item authentication token for the selected item, and displaying the progress status in the user interface.

Further, in response to receiving a user selection of a link via the user interface, the method may include the steps of providing a text input field on the display for receiving a user's text inquiry, parsing the user's text inquiry and matching the parsed user's text inquiry with a pre-determined response based on the item authentication token, retrieving the parsed response from the data storage and providing for displaying the matched pre-determined response, determining a numerical figure for the authenticated user according to the result status of the item authentication token, and aggregating data from the data records in order for displaying the plurality of attributes, displaying the progress status and determining the numerical figure for the authenticated user.

The present disclosure provides a system for aggregating data to provide a display in a user interface. The system may include a processor and non-transitory computer readable medium storing computer instructions configured to cause the processor to: populate data records in data storage of a data management system, authenticate a user for accessing the data records stored in the data management system, retrieve a list from the data records in the data storage and present for display the list in the user interface for the authenticated user, and receive a selection of an item from the list through the user interface, and in response to the selection, present for display on the user interface an item attribute and an item figure for the selected item.

The system may also include instructions when executed may cause the processor to receive, from the user interface, an item authentication token associating with the authenticated user for the selected item and create in the data storage an object history record containing a plurality of attributes for the item authentication token, update the data records stored in the data storage periodically at a pre-determined time interval by connecting with an external system that stores and processes data associated with a plurality of statuses for the item authentication token, including a result status for the item authentication token, retrieve the plurality of attributes for the item authentication token from the data records stored in the data storage, and present for display the plurality of attributes in the user interface of a user terminal, retrieve a progress status of the object history record from the data storage where the progress status is one of a plurality of pre-determined statuses that indicate a progress of the item authentication token for the selected item, and display the progress status in the user interface.

Further, in response to receive a user selection of a link via the user interface, instructions included in the system when executed may cause the processor to provide a text input field on the display for receiving a user's text inquiry, parse the user's text inquiry and match the parsed user's text inquiry with a pre-determined response based on the item authentication token, retrieving the parsed response from the data storage and provide for displaying the matched pre-determined response, determine a numerical figure for the authenticated user according to the result status of the item authentication token, and aggregate data from the data records in order for displaying the plurality of attributes, displaying the progress status and determining the numerical figure for the authenticated user.

Also, the present disclosure provides a device as a user terminal for aggregating data to provide a display in a user interface. The user terminal may include a user interface, and the user interface may be configured to authenticate a user for accessing data records in data storage stored in a data management system, receive a list from the data storage and display the list in the user interface where the data records associated with an item authentication token in the data storage of the data management system are populated, select an item from the list through the user interface, and in response to the selection, display an item attribute and an item figure for the selected item, and receive, from the user interface, the item authentication token associating with the authenticated user for the selected item and create in the data storage an object history record containing a plurality of attributes for the item authentication token.

The user terminal may also be configured to receive the plurality of attributes for the item authentication token from the data records stored in the data storage where the data records are updated periodically at a pre-determined time interval by connecting with an external system that stores and processes data associated with a plurality of statuses for the item authentication token, including a result status of the item authentication token, and present for displaying the plurality of attributes in the user interface of a user terminal, receive a progress status of the object history record from the data storage where the progress status is one of a plurality of pre-determined statuses that indicate a progress of the item authentication token for the selected item, and displaying the progress status in the user interface.

In response to receive a user selection of a link via the user interface. The user terminal may receive a text input field on the display for receiving a user's text inquiry, provide for displaying a matched pre-determined response, when the user's text inquiry is parsed and the parsed user's text inquiry with the pre-determined response based on the item authentication token is matched and is retrieved from the data storage, display a numerical figure for the authenticated user according to the result status of the item authentication token after the numerical figure is determined, and display aggregated data from the data records in order for displaying the plurality of attributes, displaying the progress status and displaying the numerical figure for the authenticated user.

BRIEF DESCRIPTION OF THE DRAWINGS

To explain the technical proposals of the examples of the present disclosure or prior art more clearly, the appended drawings used in the examples are briefly described hereunder. Apparently, the following described drawings are some examples of the present disclosure, but for persons skilled in the art, other drawings may be obtained without creative works according to these drawings.

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 9 shows an example for showing job searching results in a list view.

FIG. 11 shows an example of a referral homepage for displaying employee referral tracking information.

FIG. 13 shows an example of a referral recommendation engine for displaying employee referral tracking information.

DETAILED DESCRIPTION OF ILLUSTRATED EXAMPLES

Figure 1:
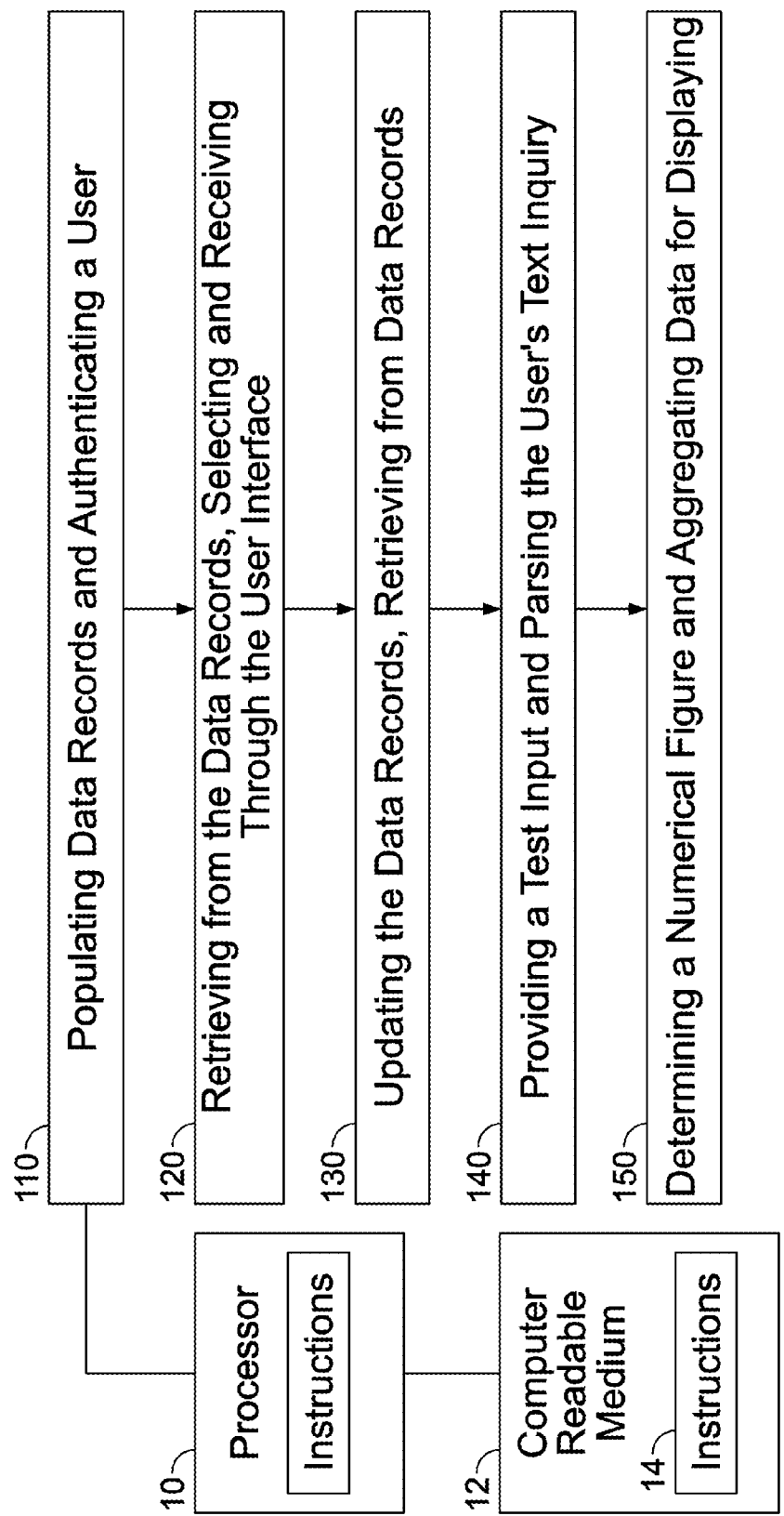
FIG. 1 is a flowchart of an example of a method for aggregating data to provide a referral tracking display in a user interface.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment or a single embodiment. Furthermore, the particular features, structures, or characteristics may be combined in any suitable manner in one or more embodiments or examples.

The terminology used in the description herein is for the purpose of describing particular examples only and is not intended to be limiting. As used herein, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the terms "module," or "unit" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term "module" or "unit" may include memory (shared, dedicated, or group) that stores code executed by the processor.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The described communication between devices may include any appropriate type of communication network for providing network connections to the server and client or among multiple servers or clients. For example, communication network may include the Internet or other types of computer networks or telecommunication networks, either wired or wireless. In embodiments, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

It should be noticed that, the embodiments/examples and the features in the embodiments/examples may be combined with each other in a no conflict condition. The inventive aspects will become apparent from the following detailed description when taken in conjunction with the accompanying drawings.

It should be noticed that, the steps illustrated in the flowchart of the drawings may be performed in a set of computer devices using executable program code. And the order of the steps may be different from that in the drawings under some status, although an example logic order is shown in the flowchart.

The purpose, technical proposal and advantages in the examples of the present disclosure will be clear and complete from the following detailed description when taken in conjunction with the appended drawings. Apparently, the examples described thereinafter are merely a part of examples of the present disclosure, not all examples. Persons skilled in the art can obtain all other examples without creative works, based on these examples.

Companies and recruiters use a variety of sources to find appropriate candidates for positions they need. Sometimes, companies and recruiters may utilize employee referrals to find the best qualified applicants. In return, the employees are awarded with referral bonus. For a small number of employee referrals, the employee referral program may be handled manually. Sometimes, the enterprise HR system may provide functions for tracking employee referrals. However, when the number of employee referrals becomes large, the manual process may not be feasible. Also, because the HR system has to handle many tasks, employee referrals are not easily made and viewed by employees in the enterprise HR system. As such, the company may not easily track employee referrals in the HR system. As a result of that, there is a need for establishing a standalone system that employees may make and view the referrals and the company can easily track the referrals. The present disclosure discloses a method, a system and a device that utilize the system integration technology for aggregating data to display employee referrals in the user interface on the user terminal. The method, system and the device enable employees to make referrals.

The disclosed method, system and device may build a tool that highlights the employee referrals model. The present disclosure may allow employee to search for relevant open positions easily, and recommend open positions to employees to reference other people outside the company employees currently work for. As such, the present disclosure may provide a rich user experience for making referrals. Single page application, demand profile, and positions search may be used for providing the method, system and device in the present disclosure.

FIG. 1 is a flowchart of an example of a method for aggregating data to provide a referral tracking display in a user interface. Steps shown in FIG. 1 may be performed by one or more processors 10 to execute instructions 14 stored in computer readable medium 12 that may not be transitory.

Step 110: Populating data records and authenticating a user.

Examples of step 110 may include: populating data records in the data storage of a data management system where the data records are associated with the employee referral. Also, examples of step 110 may include: populating data records in data storage of a data management system; and authenticating a user for accessing the data records stored in the data management system.

In order to track and display employee referrals, a data management system is required. The data management system may collect data, analyze data and aggregate data from various data sources for display. The data management system here may be designed for the employee referral. The data storage for the data management system is needed in order to store the employee referral data. Data records that are associated with the employee referral may be stored in the data storage of the data management system.

Employee referral data records may be from various sources. The data records associated with employee referral are stored in the data storage. The data records may be from various sources. For example, the external HR system may be one of sources. The HR system may store information for employees in the company. All hiring and firing activities are tracked in the HR system. Some data records associated with employee referral may be collected from the HR system such as employee id and/or employee referral history for example. Also, other sources may also be used for collecting data for the data records. For example, an employee requisition system for a company may contain the list of jobs that are needed by the company. The job descriptions for the list of jobs may also be stored in the employee requisition system.

The interface programs may be developed to collect and populate the employee referral data records stored in the data storage. The collection and population of data records for employee referrals may be essential functions for the data management system for tracking and displaying the employee referrals. The data management system may develop interface programs to collect and populate employee referral data records from various sourcing systems. The data formats for different sourcing systems may be different from the data records stored in data management system that supports the employee referrals. The interface programs may support the data format conversions between sourcing system format and the employee referral system format. Multiple interfaces may also be developed in order to populate the data records by getting data from multiple sources.

In addition, the access to the data records may be carefully controlled. For example, when a user accesses the data records stored in the data management system, the user may be authenticated. Any authentication means may be used for this purpose. The password protection may be used for controlling the access to the data records. The fingerprint may also be used for checking to make sure the user attempting to access the data records is authorized to do so. Multiple tiers of the access may be developed. For example, the data administrator may have a different data access authority from a super user, and the data record access authority for a super user may be different from the access authority for a regular user.

Multiple access authentications for a single user may also be designed and developed. For example, a super user may pass multiple authentications before the access to the data records may be granted. For example, the first check may be conducted to authenticate the super user for using the authorized the access device and the second check may be conducted to authenticate the super user for accessing part or all of the data records stored in the data management system.

Step 120: Retrieving from the data records, selecting and receiving through the user interface. Examples of step 120 may include: retrieving a job list from the data storage and displaying the job list in the user interface; selecting a job from the job list through the user interface, and in response to the selection, displaying a job description and an award for referring the selected job; receiving, from the user interface, an identification for the job candidate of the job from the employee and creating in the data storage a referral record containing a candidate profile for the job candidate.

Examples of step 120 may also include: retrieving a list from the data records in the data storage and and presenting for display the list in the user interface for the authenticated user; receiving a selection of an item from the list through the user interface, and in response to the selection, presenting for display an item attribute and an item figure for the selected item; and receiving, from the user interface, an item authentication token associating with the authenticated user for the selected item and creating in the data storage an object history record containing a plurality of attributes for the item authentication token.

The job list and the job description for referrals may be stored in the data storage. Job lists may be stored in the data records of the data management by collecting data from sourcing systems by the data management system. Both the job list and the associated job descriptions may be collected from an external system as part of data collection and population by using the interface programs. As the job list and the job descriptions may be required for the employees to view before employees may make any referrals. The job list and associated job descriptions may be stored in the data storage as data records. Even though it is possible to store the job list and job descriptions outside the data management system for the employee referrals, it may be more efficient to store such information inside the system.

The user interface may be developed for retrieving and displaying the job list and the job description. The employee may view the job list and associated job descriptions via a user terminal. The user interface may be developed for the user terminal to display the job list and job descriptions. The user interface may be any formats that are compatible with the user terminal. For example, a webpage user interface may be designed, developed and displayed in a smart phone, a tablet or a PC or any other user terminal devices. The data records stored in the data storage for the job list and job descriptions may be retrieved and displayed on the user interface. Also, a referral bonus for each needed job may be displayed along with the job list and the job description. When the job list and job descriptions may be retrieved from the data storage, the referral amount may also be selected from the data storage and displayed along with the jobs in the job list.

Employees may make referrals by using the user interface. The employee may view the job list and job descriptions after the job list and job descriptions are displayed via the user interface. The employee may select a job from the job list. The job description for the selected job may be displayed for the employee to review. An award associated with the job in the job list may also be displayed. The employee may make the referral for the job selected. The employee may provide an identification of the job candidate for making the referral for the selected job in the job listed. The identification may be in any forms to identify the job candidate. For example, the job candidate name, telephone number, address and/or a serial number. The job candidate may be identified by a combination of one or more identifications.

The profile of the job candidate may be needed for making the referral. In order for the employee to make a referral, a profile may be required for job candidate including job candidate name, address, contact information, and resume. The profile of the job candidate may exist in the data storage of the system. If the profile exists, the employee may make a referral by retrieving the job candidate from the data storage. However, when the profile of the job candidate does not exist in the data storage, the employee may have to create a profile for the job candidate before the referral can be made.

The user interface may be designed and developed for the employee to create and store the profile of job candidate in the system. The employee may enter the job candidate information manually by using the user interface provided by the system to enter the name, address, contact information of the job candidate. The employee may also use the user interface to enter and/or upload the job candidate's resume. The profile may be saved to the system after all information is entered via the user interface.

The job candidate information may be collected from external sources automatically. Such automatic collection and population may be done by the event-driven or batch updates. In case of the event-drive, the job candidate information collection and population may be done by using the he job candidate's identification that may be provided by the user interface. For example, after the employee enters the job candidate's name, the system may conduct a lookup in the sourcing system and collect the needed information remotely and update the data records in the data management system. The collected information may also be displayed in the user interface.

The batch updates from the external system may be used to collect job candidate information. The job candidate's profile information may not exist in the system initially, the batch process may be setup to collect the candidate information from external systems. For example, every day at 11:00 pm, the batch process may be scheduled to run to collect newly created job candidate information such as resumes, address, contact information and/or third party credit history from external sourcing systems and update the data records in the data management system.

As an example of the technical implementation of step 120, a list that includes the job list and referral award amount for the job may be retrieved from the data records and may be displayed for the authenticated user. The user may be select an item from the list and display the item attribute and an item for the selected item. In the one example implementation, the user may select a listed job from the list, and display a job description and the referral award amount is the user interface. When the user selects the listed job and makes the referral, the referral record may be created in the data storage.

The identification for the employee to select a job candidate for a job in the job list may be implemented as an item authentication token. The item authentication token may be a security device that may be used to identify the referral made by an employee. The item authentication token may be a software token stored in the data storage. Alternatively, the item authentication token may be implemented as a hardware device that may be used to identify the referral made by the employee. The item authentication token may be implemented by storing cryptographic keys such as a digital signature, or biometric data, such as fingerprint minutiae. The item authentication token may also be implemented by storing a unique identification code such as identification for the job and a unique identification for the employee such as the employee number. The referral record that stores the referral related information may be implemented as an object history record that may contain a plurality of attributes of the referral records for the item authentication token. The object history record that contains attributes of the item authentication token may be stored in the data storage.

Step 130: Updating the data records, retrieving from data records.

Examples for step 130 may include: updating the data records stored in the data storage periodically at a pre-determined time interval by connecting with an external system that stores and processes data associated with the hiring of the job candidate, including a status of the hiring of the job candidate; retrieving the candidate profile from the data records stored in the data storage, and displaying the candidate profile in the user interface of a user terminal; retrieving a status of the referral record from the data storage wherein the status is one of a plurality of pre-determined statuses that indicate a progress of the employee referral, and displaying the status in the user interface.

Examples of step 130 may also include: updating the data records stored in the data storage periodically at a pre-determined time interval by connecting with an external system that stores and processes data associated with a plurality of statuses for the item authentication token, including a result status for the item authentication token; retrieving the plurality of attributes for the item authentication token from the data records stored in the data storage, and presenting for display the plurality of attributes in the user interface of a user terminal; and retrieving a progress status of the object history record from the data storage wherein the progress status is one of a plurality of pre-determined statuses that indicate a progress of the item authentication token for the selected item, and displaying the progress status in the user interface.

The data records stored in the data storage may be updated constantly. The data records for the employee referrals may change with the time being. For example, when a job is added in the job list, the data records for the employee referrals may be updated to add the new job in the system. Also, when a referred job candidate is hired, the data records in the system may need to update to reflect the status change. As such, the interface programs between the data management system and the external systems may have to run periodically. The frequency to run a particular interface program may be pre-determined. For example, the interface program for the HR system may run twice a day and the interface program for the job requisition system may run once a day.

The frequencies may be adjustable. Sometimes, the jobs may be needed for certain geographic area during a certain time period, the interface program for getting data to update data records for the certain geographic area may be more frequent than for other areas. Also, at the start of the quarter or the fiscal year, the company may hire more new employees that in other time periods. Therefore, the hiring activities for the beginning of the quarter or beginning of the fiscal year may show the significant increases. As such, the hiring status may need to be updated more frequently during the beginning of the quarter or the beginning of the fiscal year. The frequency of running the interface programs may be adjusted seasonally.

The data record update may also be event driven. For infrequent and low volume update, the even driven may be more efficient. For example, if only two new jobs are created for one day, there is no need to run the interface program to update the job list three times a day. As such, the data record update may be setup for the event driven. As such, the interface program may need to run whenever there is a new job created in the job requisition system. However, when the update volume becomes large, the schedule batch updates may become more efficient than the event driven updates. For example, if one hundred jobs are created per day, one batch update is more efficient than running one hundred even-driven updates.

The candidate profile may be retrieved from the data storage and displayed in the user interface. Each job candidate referred by the employee may have a profile stored in data records of the data storage. The candidate profile include a status of the job candidate may be collected from the external system via interface programs or created by the employee manually. A user interface on the user terminal may be provided for the employee to create the job candidate profile. Also, when the candidate profile is stored in the data storage, the system may retrieve the candidate profile from the data storage and display the candidate profile to the employee via the user interface (a webpage for example).

Each employee referral may keep a status. A status field for each employee referral may be kept in the data storage. Since each employee referral may associate with one employee, the status for each employee referral may associate with the one employee as well. The status may show whether the referral is made and when is made. The status may also show the progress of the employee referral. For example, the status may show whether the interview is conducted and whether the job candidate is hired, etc.

Multiple statuses may be associated with one employee referral. Each employee referral may have multiple statuses that may show various stages of the hiring of the job candidate. Such multiple statuses may be pre-determined. For example, four statuses for one employee referral may be pre-determined: pending review, in review, in progress, hired. Also, the additional statuses may be defined for the job candidate. For example, the job candidate moves to another job, the job candidate rejects the job offer or the interview, or the job candidate withdraws. After the statuses for the employee referral are determined, the system may display the statuses in the user interface. Because the item authentication token may be implemented to identify the job referral and the object history record may be implemented as a referral record. The status for the item authentication token may indicate the stage of the hiring of a job candidate. The statuses for the employee referral, even though they may be representations of statuses of the item authentication token, they may be stored differently from statuses of the item authentication token and may be implemented as statuses of the object history record. For example, the status for the item authentication token may be "hired" and status for the object history record may be "1." The attributes for the item authentication token may be implemented for a candidate profile.

Step 140: Providing a test input and parsing the user's text inquiry.

Examples of step 140 may include: in response to receiving a user selection of a link via the user interface, providing a text input field on the display for receiving a user's text inquiry; parsing the user's text inquiry and matching the parsed user's text inquiry with a pre-determined response associated with the employee referral and displaying the matched pre-determined response.

Other examples of step 140 may include: in response to receiving a user selection of a link via the user interface, providing a text input field on the display for receiving a user's text inquiry; and parsing the user's text inquiry and matching the parsed user's text inquiry with a pre-determined response based on the item authentication token, retrieving the parsed response from the data storage and providing for displaying the matched pre-determined response.

The employee may select a link in the user interface when there is a need for help. The user interface for tracking the employee referrals may be designed for various employees with different technical backgrounds. Employees may have various questions when using the user interface face to track the referral status and/or make referrals. The user interface may show a link that the employee may select to ask for help if needed. For example, the user interface may show "Have Questions?" and provide a link below that the employee may click. After the employee may select the link by clicking the link, a second user interface may be shown to the employee to allow employee to enter questions.

The second user interface may appear like an instant message. When second user interface is shown to the employee, the second user interface may be designed to be the same or similar to an instant messaging interface. The employee may feel a live support personnel is on duty to answer questions. The employee may be allowed to enter the questions in a text input field that may be provided by the second user interface.

The answers to the employee's questions may be provided by selecting from pre-determined responses. However, the live support personnel may not be on duty when the employee asks questions by entering questions in the second interface. The data management system may store various pre-determined responses to employee inquires. When the employee may enter a question, the question may be parsed and analyzed. The system may conduct a search to the data records stored in the data storage of the data management system and attempt to find the answer or answers for the question. For example, when an employee types "what could my reward be for a successful referral?" in the second interface, the system may parse the question and find a match in the data records stored in the system and respond by displaying:

"Let me get that for you . . . . Your referral bonus depends on a few variables. Check out our new Referral Bonus Widget which will help you to determine the referral bonus you're eligible for. You will find our widget on the left hand side of our Employee Referral Site: http://employeereferral.comany.com."

Such assistance without live support personnel on duty is also called virtual assistance. In order to make the response appear to be from live personnel, a person's name may be shown as the respondent for the employee's inquiry. Also, if needed, the live personnel may be arranged to be on duty to answer questions as well.

Step 150: Determining a numerical figure and aggregating data for displaying.

Examples for step 150 may include: determining an amount awarded to the employee according to the status of the referral record; and aggregating data from displaying the candidate profile, displaying the status and determining the amount awarded.

Other examples for step 150 may include: determining a numerical figure for the authenticated user according to the result status of the item authentication token; and aggregating data from the data records in order for displaying the plurality of attributes, displaying the progress status and determining the numerical figure for the authenticated user.

The amount award may be a numerical figure for the authenticated user. The amount may be determined according to the status of the referral. In the example implementation, the amount may be determined based on the result status of the item authentication token. For example, a numerical figure to represent the referral bonus for the authenticated user may be calculated when the referred employee is hired.

The user interface of the user terminal may show the status of the referral rewards. The user interface may show the various statuses of the referral rewards. For example, "the interview is scheduled" status for a job candidate that the employee referred. Also, the user interface may show the amount the employee is going to get for the successful referral. The system may calculate the referral bonus amount according to the statues of the employee referrals. For example, the rule for the employee to receive the referral bonus may be when the job candidate is hired and has worked on the job for one month. If the status shows that the job candidate is hired and has worked on the job for one month. The system may determine the amount that should be awarded to the employee and display the amount in the user interface. The employee awards may be calculated according to the geographic areas, level of position, etc. The status to show the progress of the employee referral may also be implemented as the progress status of the history object record.

Further, the employee referral status information may be sent to the employee payroll system via an interface program so that a payment to the employee may be made accordingly. The user interface may not only display the amount the employee may be received, the user interface may also display the amount that the employee may be received in the future. For example, if the employee is hired, the system may determine when will be the date for the job candidate to be on the job for one month after the job candidate is hired and may display that the employee may be entitled to receive the bonus on the particular date. The user interface may also display how much employee referral bonus the employee may have received in the past accumulatively in different categories.

The method shown in FIG. 1 may include a sub-step of assigning a display priority to each data element of the of the aggregated data; and displaying a subset of data elements in the user interface within a single webpage according to the display priority and content size of the subset of data elements.

The display priority for data elements may be required for the single webpage display. The single webpage display may only display contents in one webpage even though the contents that are needed to display are more than one webpage may display. For example, even though data elements may contain contents that will occupy five pages, only a subset of collected data elements that can fit in one page may be displayed. Therefore, a subset of the data elements may be selected among displayable data elements and are displayed in the single webpage. As such, the display priority for data elements may be needed in order to make selections to display those data elements with contents that are more important than other less important data elements.

The size of the single webpage may also be needed. The display priority may help to decide the subset of data elements that are more important than others. However, it is also important to know how much data the single webpage may display. As such, the size of the single webpage may be required in order to decide what data elements may be selected and displayed.

The single page application (SPA) provides a more fluid user experience. The user does not need to scroll up and scroll down to view information displayed in the webpage. The single page application requires additional client-side code to respond to user actions. One of the possible approaches may be to evaluate the SPA frameworks that are currently available within Microsoft Visual Studio templates to select the SPA template. The system integration may be needed and the display prioritization for data elements may still be required for the implementation of the single page application.

The technical challenges for implementing SPA framework may include: Responsive design, UI Controls, Animations/Multimedia/Graphics support, MVC, Single Panel/Multiple Views/with, Pre-Loading capabilities, Data Binding, Deep Linking, Testing and Security. Some decision factors for implementing SPA framework may include: Maturity/Stability, Performance, File Size, First Load, Learning Curve, Development Flow.

The candidate profile of the job candidate disclosed in the method shown in FIG. 1 may also be formed by either creating a new candidate profile or selecting from an existing candidate profile that is stored in the data storage. If the candidate profile exists in the data storage, the employee may make a referral for the job candidate for a job listed by selecting from the job candidate profile from the data storage. However, when the candidate profile does not exist in the data storage system, the employee may have to create a new job candidate profile and save the profile in the data storage. The creation of the profile may include uploading the job candidate resume and adding contact information. The creation may be done manually or the information may be partially or fully pulled from other external systems.

According to step 130 shown in FIG. 1, the plurality of attributes for the item authentication token are formed by either creating a new object history record or selecting an existing object history record that is stored in the data storage.

The method as shown in FIG. 1 may further include the step of connecting a social media with the data management system and displaying a social media link in the user interface. The user interface of the user terminal may display a link for connecting to an external social media such as LinkedIn for example. The employee may click the link to access the external social media to gather the information for making the referral.

The step of parsing the user's text inquiry shown in FIG. 1 may also include determining context of the user's text inquiry. When the context of the user's inquiry is determined to be unrelated to the employee referral, the system may transmit the pre-determined response to indicate that the user's text inquiry is improper. For example, if the employee asks "have you dated with anyone?" via the user interface, the system will determine that the question has no relationship with the employee referral and then automatically pull a pre-determined response and transmit the response "this inquiry is unrelated" to the user interface for displaying. The example implementation of the employee referral may be the item authentication token.

The method in FIG. 1 may further include the step of sending an automatic notification to the employee upon a change of the status for the referral record in the data storage. The example implementation may include: sending an automatic notification to the authenticated user upon a change of the progress status of the object history record in the data storage.

When the status of the referral record is changed due to the progress of the job candidate's hiring process and/or any other reasons, the authenticated user, such as an employee, may be notified automatically. For example, if the referred job candidate is interviewed, an email may be generated and sent to the employee to inform the employee that the job candidate is interviewed. The notification may be sent to the employee by using any available electric means such as phone calls, text messages, instant messages, emails or social media tools. The notification may also be generated by using other means, such as a letter.

The step of providing for displaying the matched pre-determined response disclosed in the method shown in step 140 of FIG. 1 may include displaying the matched pre-determined response in a second user interface on the user terminal wherein the second user interface is different from the user interface. The pre-determined response may be displayed in an instant messaging dialog screen while the user interface for showing the link may be a webpage designed and developed for providing a display for tracking the employee referrals.

Figure 2:
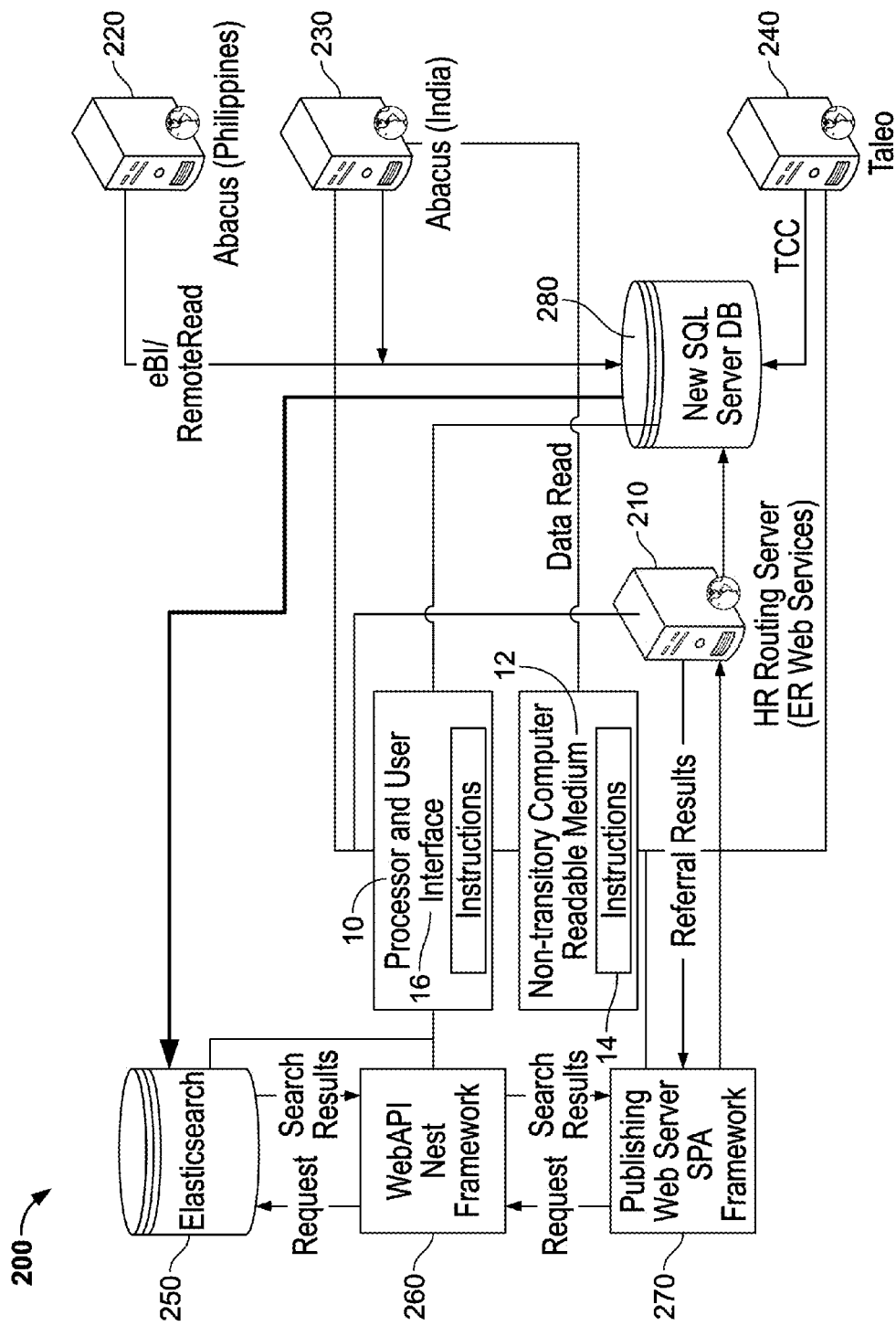
FIG. 2 illustrates a system for aggregating data to provide a referral tracking display in a user interface.

FIG. 2 illustrates a system for aggregating data to provide a referral tracking display in a user interface. As shown in FIG. 2, a system is provided for aggregating data to provide a display in a user interface for tracking an employee referral of a job candidate for an employer of an employee. As shown in FIG. 2, the system 200 may include a HR routing sever 210, a new SQL database server 280, a computer in the other country such as a computer in Philippines 220 and/or a computer in India 230, an external server such as Elasticsearch sever 250, Taleo server 240, Web API 260, Publishing web server 270 etc. Each server includes at least one processor 10, a user interface 16, and non-transitory computer readable medium 12 storing computer instructions 14.

One example implementation of the system 200 may include one or more processors 10 and the computer readable medium other than transistory 12 storing computer instructions 14 configured to cause the one or more processors to: populate data records in the data storage of a data management system wherein the data records are associated with the employee referral, retrieve a job list from the data storage and displaying the job list in the user interface, select a job from the job list through the user interface, and in response to the selection, display a job description and an award for referring the selected job, and receive, from the user interface, an identification for the job candidate of the job from the employee and create in the data storage a referral record containing a candidate profile for the job candidate.

The system may also include instructions that when executed may cause the one or more processors to: update the data records stored in the data storage periodically at a pre-determined time interval by connecting with an external system that stores and processes data associated with the hiring of the job candidate, including a status of the hiring of the job candidate, retrieve the candidate profile from the data records stored in the data storage, and display the candidate profile in the user interface of a user terminal, and retrieve a status of the referral record from the data storage wherein the status is one of a plurality pre-determined statuses that indicate a progress of the employee referral, and display the status in the user interface.

Further, in response to receive a user selection of a link via the user interface, the instructions included in the system shown in FIG. 2 when executed may cause the one or more processors to provide a text input field on the display for receiving a user's text inquiry, parse the user's text inquiry and matching the parsed user's text inquiry with a pre-determined response associated with the employee referral and display the matched pre-determined response, determine an amount awarded to the employee according to the status of the referral record, aggregate data from displaying the candidate profile, and displaying the status and determining the amount awarded.

The system as shown in FIG. 2 may further include instructions that when executed may cause the one or more processors to assign a display priority to each data element of the of the aggregated data, and display a subset of data elements in the user interface within a single webpage according to the display priority and content size of the subset of data elements.

Another example implementation of the system 200 may include one or more processors 10 and the computer readable medium other than transistory 12 storing computer instructions 14 configured to cause the one or more processors to: populate data records in data storage of a data management system; authenticate a user for accessing the data records stored in the data management system; retrieve a list from the data records in the data storage and present for display the list in the user interface for the authenticated user; and receive a selection of an item from the list through the user interface, and in response to the selection, present for display on the user interface an item attribute and an item figure for the selected item.

The system as shown in FIG. 2 may further include instructions that when executed may cause the one or more processors to receive, from the user interface, an item authentication token associating with the authenticated user for the selected item and create in the data storage an object history record containing a plurality of attributes for the item authentication token; update the data records stored in the data storage periodically at a pre-determined time interval by connecting with an external system that stores and processes data associated with a plurality of statuses for the item authentication token, including a result status for the item authentication token; retrieve the plurality of attributes for the item authentication token from the data records stored in the data storage, and present for display the plurality of attributes in the user interface of a user terminal; retrieve a progress status of the object history record from the data storage wherein the progress status is one of a plurality of pre-determined statuses that indicate a progress of the item authentication token for the selected item, and display the progress status in the user interface.

Further, the example of the system 200 as shown in FIG. 2 may further include instructions that when executed may cause the one or more processors to in response to receive a user selection of a link via the user interface, provide a text input field on the display for receiving a user's text inquiry; parse the user's text inquiry and match the parsed user's text inquiry with a pre-determined response based on the item authentication token, retrieving the parsed response from the data storage and provide for displaying the matched pre-determined response; determine a numerical figure for the authenticated user according to the result status of the item authentication token; and aggregate data from the data records in order for displaying the plurality of attributes, displaying the progress status and determining the numerical figure for the authenticated user.

The candidate profile of the job candidate as disclosed in the system as shown in FIG. 2 may be formed by either creating a new candidate profile or selecting an existing candidate profile that is stored in the data storage.

As an additional example, the plurality of attributes for the item authentication token in the system 200 may be formed by either creating a new object history record or selecting an existing object history record that is stored in the data storage.

In addition, the system as shown in FIG. 2 may include instructions to connect a social media with the data management system and display a social media link in the single webpage for connecting to the social media.

The instructions to parse the user's text inquiry in the system in FIG. 2 may include instructions to determine context of the user's text inquiry, and when the context is determined to be unrelated to the employee referral (or may be implemented as the item authentication token), transmit the pre-determined response to indicate that the user's text inquiry is improper.

The system shown in FIG. 2 also may include instructions when executed may cause one or more processors to send an automatic notification to the employee upon a change of the status for the referral record in the data storage. As an example of the implementation, the system 200 may include instructions that when executed may cause one or more processors to send an automatic notification to the authenticated user upon a change of the progress status of the object history record in the data storage.

The instructions to display the matched pre-determined response as provided in the system shown in FIG. 2 may include instructions to display the matched pre-determined response in a second user interface on the user terminal where the second user interface is different from the user interface.

Figure 3:
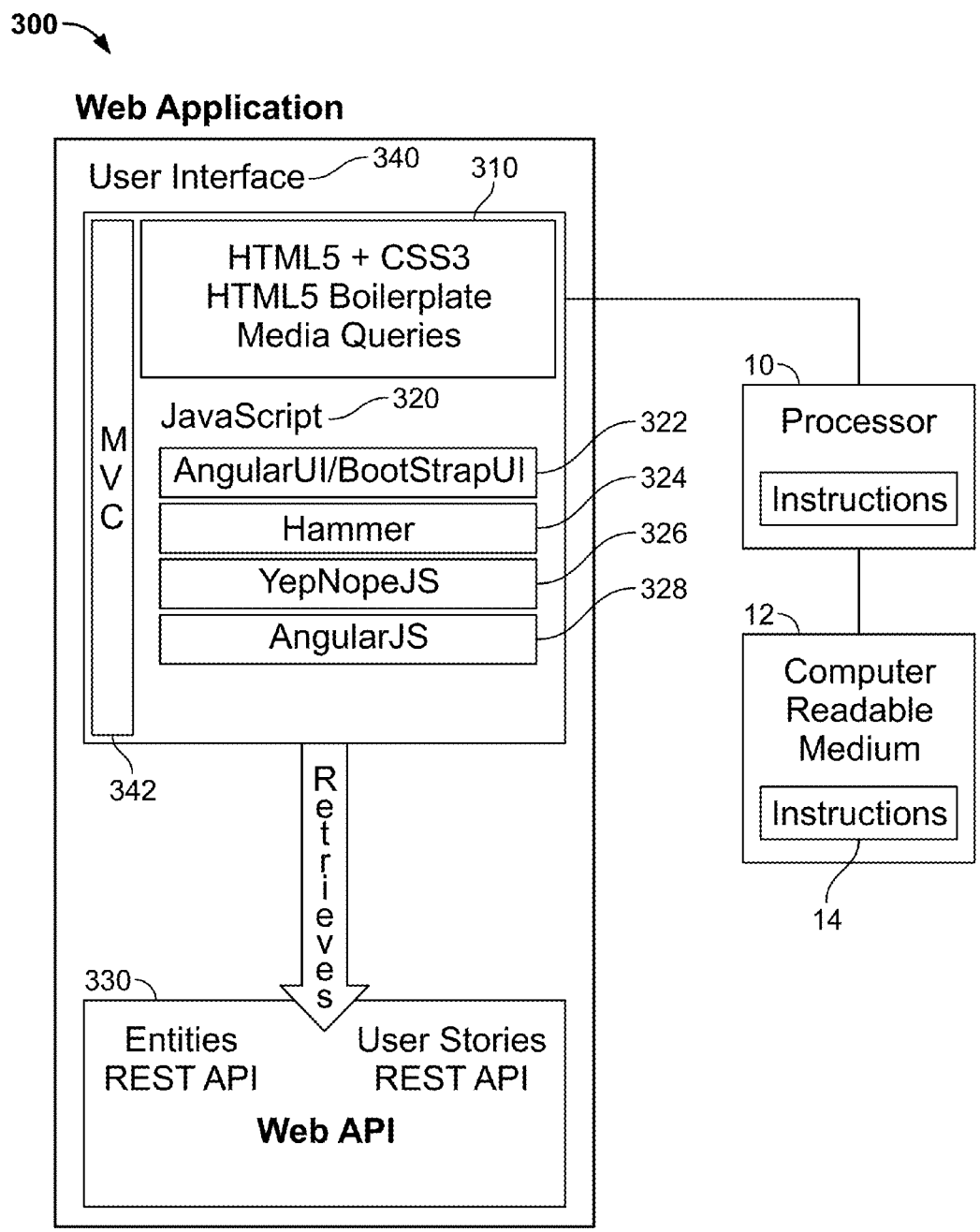
FIG. 3 illustrates a user terminal for displaying referral tracking information.

FIG. 3 illustrates a device as a user terminal 300 for displaying referral tracking information. As disclosed in FIG. 3, the user terminal is provided for displaying aggregated data for tracking an employee referral of a job candidate for an employer of an employee.

The user terminal shown in FIG. 3 may include a user interface 340. The user interface 340 may be developed by using HTML5+CSS3 HTML5 Boilerplate Media queries 310 and Javascript 320. The Javascript 320 may include different models or frameworks such as AngularUI/BootStrapUI 322, Hammer 324, YepNopeJS 326 and/or Angular JS 328 etc. The user interface 340 may also include a model view controller (MVC) 342 to interconnect models and parts for implementation of the user interface 340. The user interface 340 may retrieve data from Web API 330 for displaying.

As an example implementation, the user interface framework 340 may include JavaScript stack 320 that may include AngularUI and Bootstrap UI libraries for UI controls 322, HammerJS 324 to add touch events (tablets), YepnopeJS 326 to load dependencies dynamically, AngularJS 328 to assist the development and with the application running for Single Page Applications based on Model-View-Controller capability 342, and CSS3 and jQuery 310 to implement animations and graphics.

As shown in FIG. 3, one of the possible user interface framework 340 for the employee referral program may include HTML5 stack that may include HTML5 Boilerplate to implement the responsive design adding jQuery, HTML5 Polyfills, HTML/CSS Template 310 based on our preferred configuration.

The user terminal 300 shown in FIG. 3 may include one or more processors 10 and computer readable medium other than transitory 12 and instructions 12 stored in the computer readable medium 12 when executed may cause the one or more processors to: receive a job list from a data storage and display the job list in the user interface where data records associated with the employee referral in the data storage of a data management system are populated, select a job from the job list through the user interface, and in response to the selection, display a job description and an award for referring the selected job, and receive, from the user interface, an identification for the job candidate of the job from the employee and create in the data storage a referral record containing a candidate profile for the job candidate.

Also, the user terminal 300 may be configured to receive the candidate profile from the data records stored in the data storage wherein the data records are updated periodically at a pre-determined time interval by connecting with an external system that stores and processes data associated with the hiring of the job candidate, including a status of the hiring of the job candidate, and display the candidate profile in the user interface of a user terminal, receive a status of the referral record from the data storage wherein the status is one of a plurality of pre-determined statuses that indicate a progress of the employee referral, and display the status in the user interface.

Further, in response to receive a user selection of a link via the user interface 340, the user terminal may receive a text input field on the display for receiving a user's text inquiry, display a matched pre-determined response when the user's text inquiry is parsed and the parsed user's text inquiry with a pre-determined response associated with the employee referral is matched, display an amount awarded to the employee according to the status of the referral record after the amount is determined, and display aggregated data for the candidate profile, the status and the amount awarded.

The user terminal 300 shown in FIG. 3 may further be configured to display a subset of data elements in the user interface within a single webpage according to a display priority and content size of the subset of data elements after the display priority to each data element of the of the aggregated data is assigned.

Another implementation of the user terminal 300 shown in FIG. 3 may include a user interface 340 where the user interface 340 may be configured to: authenticate a user for accessing data records in data storage stored in a data management system; receive a list from the data storage and display the list in the user interface wherein the data records associated with an item authentication token in the data storage of the data management system are populated; select an item from the list through the user interface, and in response to the selection, display an item attribute and an item figure for the selected item; and receive, from the user interface 340, the item authentication token associating with the authenticated user for the selected item and create in the data storage an object history record containing a plurality of attributes for the item authentication token.

The user interface 340 may further be configured to receive the plurality of attributes for the item authentication token from the data records stored in the data storage wherein the data records are updated periodically at a pre-determined time interval by connecting with an external system that stores and processes data associated with a plurality of statuses for the item authentication token, including a result status of the item authentication token, and present for displaying the plurality of attributes in the user interface of a user terminal; and receive a progress status of the object history record from the data storage wherein the progress status is one of a plurality of pre-determined statuses that indicate a progress of the item authentication token for the selected item, and displaying the progress status in the user interface.

The user interface 340 may further be configured to in response to receive a user selection of a link via the user interface, receive a text input field on the display for receiving a user's text inquiry; provide for displaying a matched pre-determined response, when the user's text inquiry is parsed and the parsed user's text inquiry with the pre-determined response based on the item authentication token is matched and is retrieved from the data storage; display a numerical figure for the authenticated user according to the result status of the item authentication token after the numerical figure is determined; and display aggregated data from the data records in order for displaying the plurality of attributes, displaying the progress status and displaying the numerical figure for the authenticated user.

The candidate profile of the job candidate as disclosed in the user interface 340 of the user terminal shown in FIG. 3 may be formed by either creating a new candidate profile or selecting an existing candidate profile that is stored in the data storage. Another example implementation for the user interface 340, where the plurality of attributes for the item authentication token are formed by either creating a new object history record or selecting an existing object history record that is stored in the data storage.

The user interface 340 of the user terminal as shown in FIG. 3 may be configured to connect a social media with the data management system and display a social media in the user interface.

The user terminal 300 of FIG. 3 may be configured to transmit the pre-determined response to indicate that the user's text inquiry is improper when context of the user's text inquiry is determined to be unrelated to the employee referral (or may be implemented as the item authentication token).

As shown in FIG. 3, the user terminal 300 may be configured to display the matched pre-determined response in a second user interface on the user terminal.

Figure 4A:
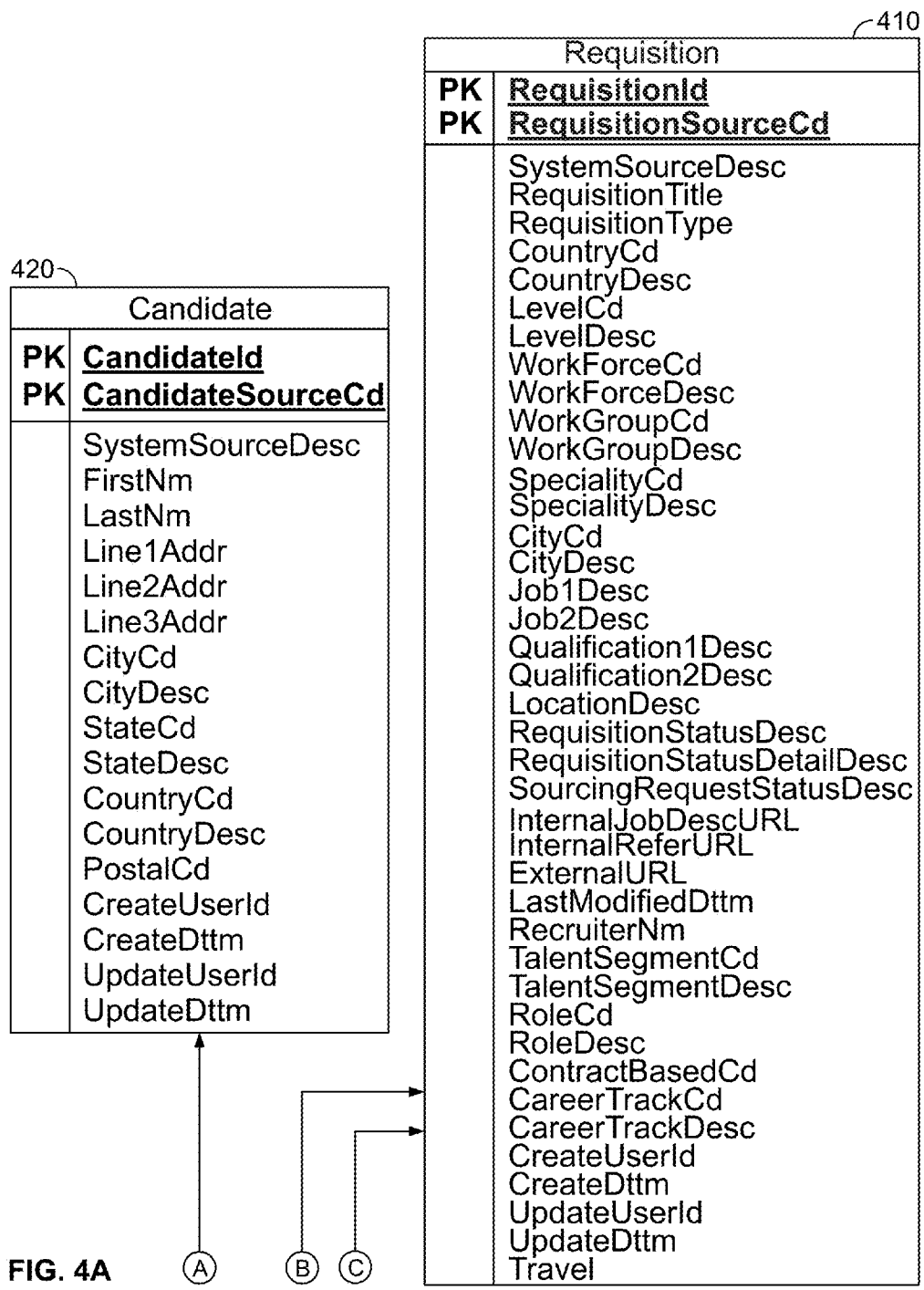
FIG. 4A and FIG. 4B shows part 1 of a rational data model for providing a display for tracking employee referrals.
Figure 4B:
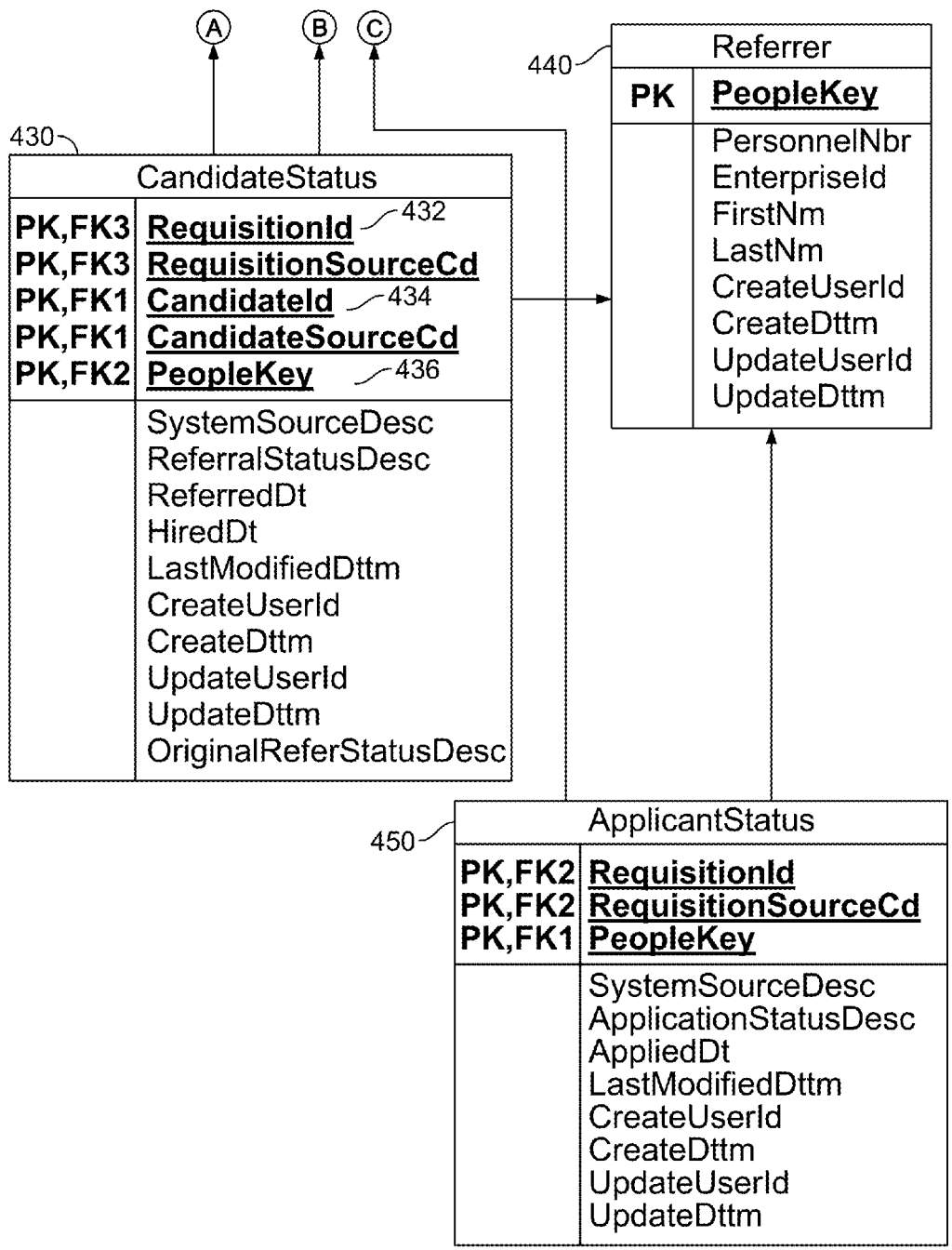

FIG. 4A and FIG. 4B shows part 1 of a rational data model for providing a display for tracking employee referrals. In FIG. 4A, tables of requisition 410 and candidate 420 are shown. In FIG. 4B, candidate status 430, referrer 440 and applicant status 450 are shown. The data flows among those tables are also shown in FIG. 4A and FIG. 4B.

As an example implementation, when an item authentication token is created, three data elements may be attached to the item authentication token. As shown in candidate status 430 of FIG. 4B, requisitionId 432 that identifies the available job, candidateId 434 that identifies the job candidate and peopleKey 436 that identifies the person to make the referral may be used to track the item authentication token. In the example implementation, the combination of requisitionId 432, candidateId 434 and peopleKey 436 as shown in FIG. 4B may be used to identify the item authentication token.

Figure 5:
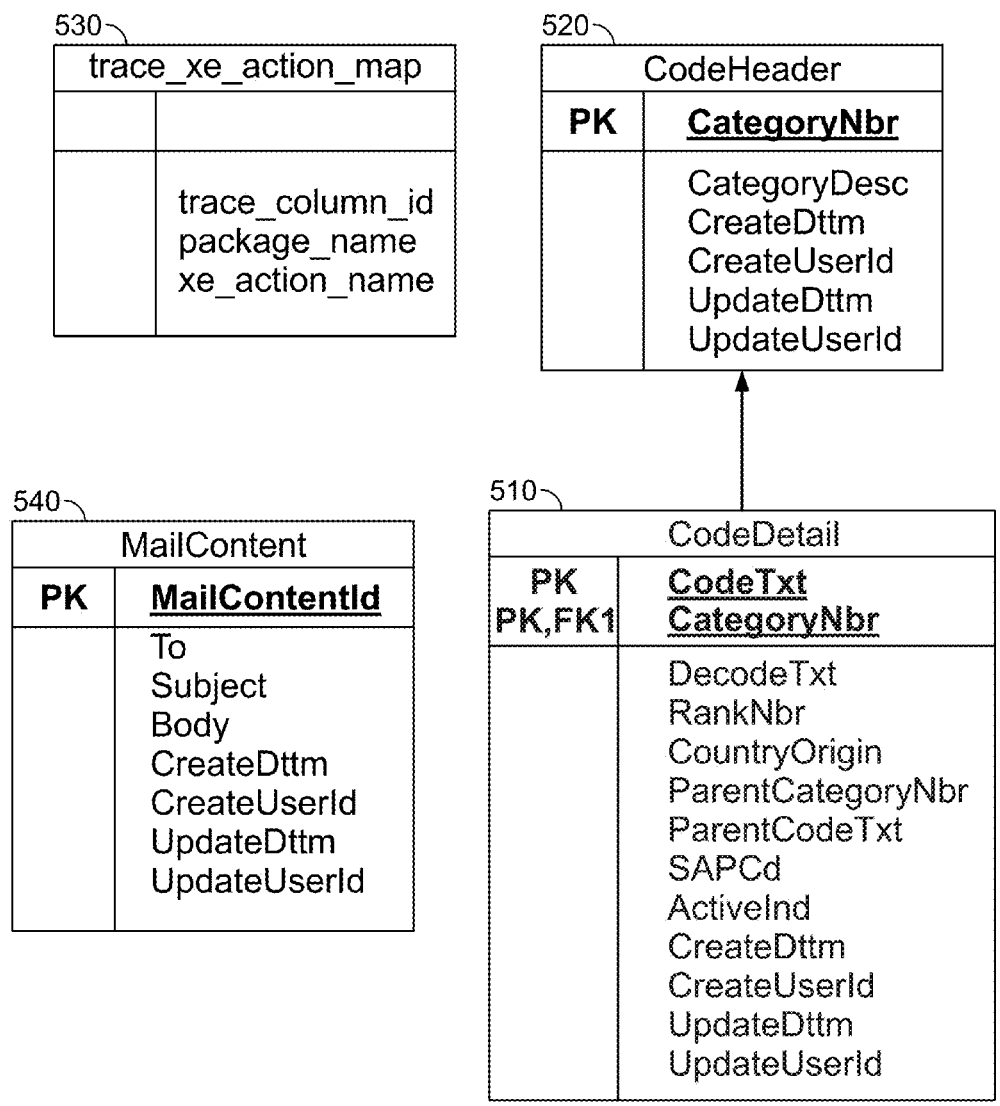
FIG. 5 shows part 2 of a rational data model for providing a display for tracking employee referrals.

FIG. 5 shows part 2 of a rational data model for providing a display for tracking employee referrals. FIG. 5 shows tables of code header 520 and code details 510 and tables of trace action map 530 and mail content 540. The data flow of code detail and code header is shown in FIG. 5.

Figure 6:
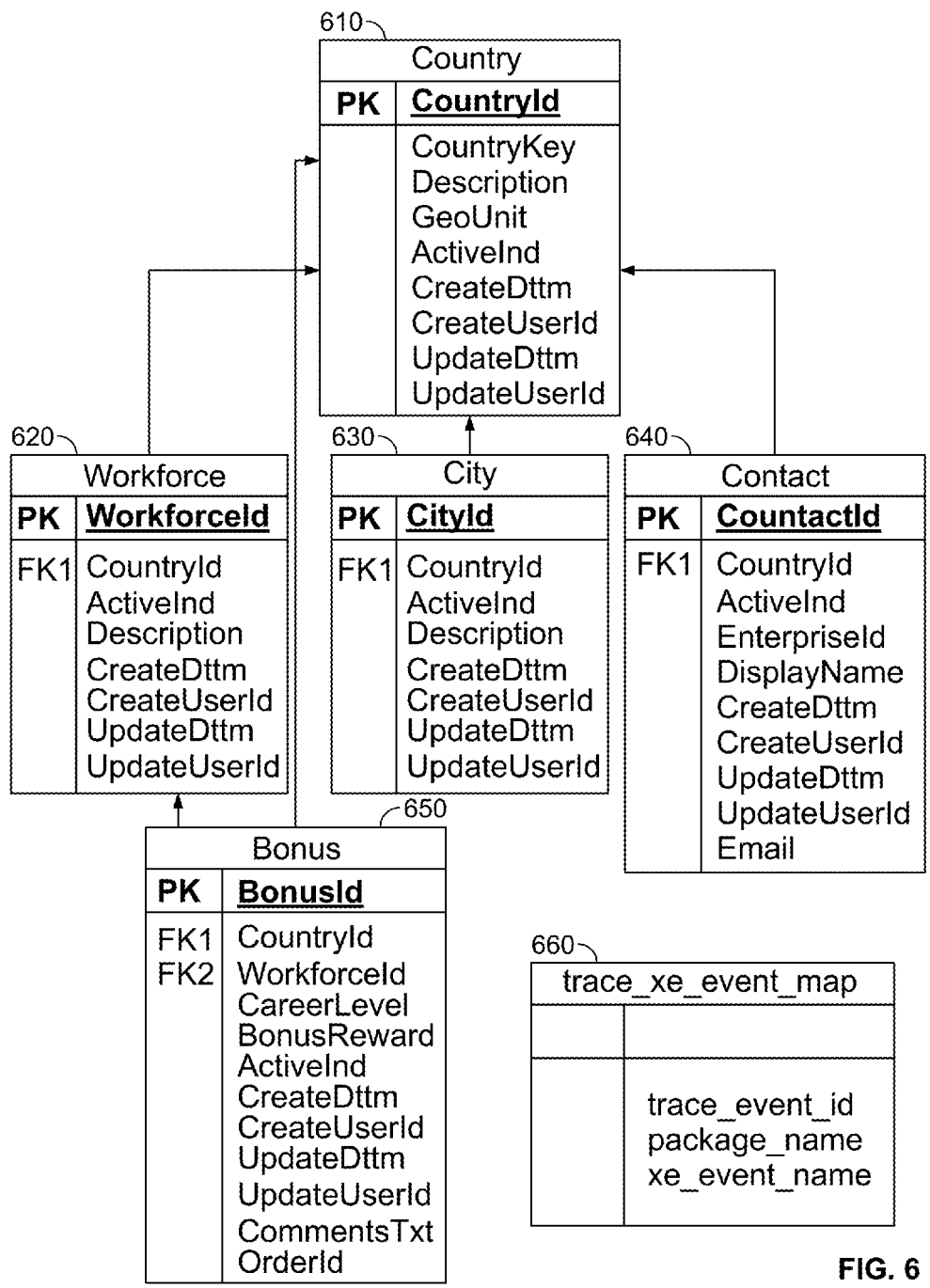
FIG. 6 part 3 of a rational data model for providing a display for tracking employee referrals.

FIG. 6 part 3 of a rational data model for providing a display for tracking employee referrals. FIG. 6 shows tables of country 610, workforce 620, city 630, contact 640, bonus 650 and trace even map 660. The data flows for tables of country, workforce, city, bonus and contact are shown in FIG. 6.

Figure 7:
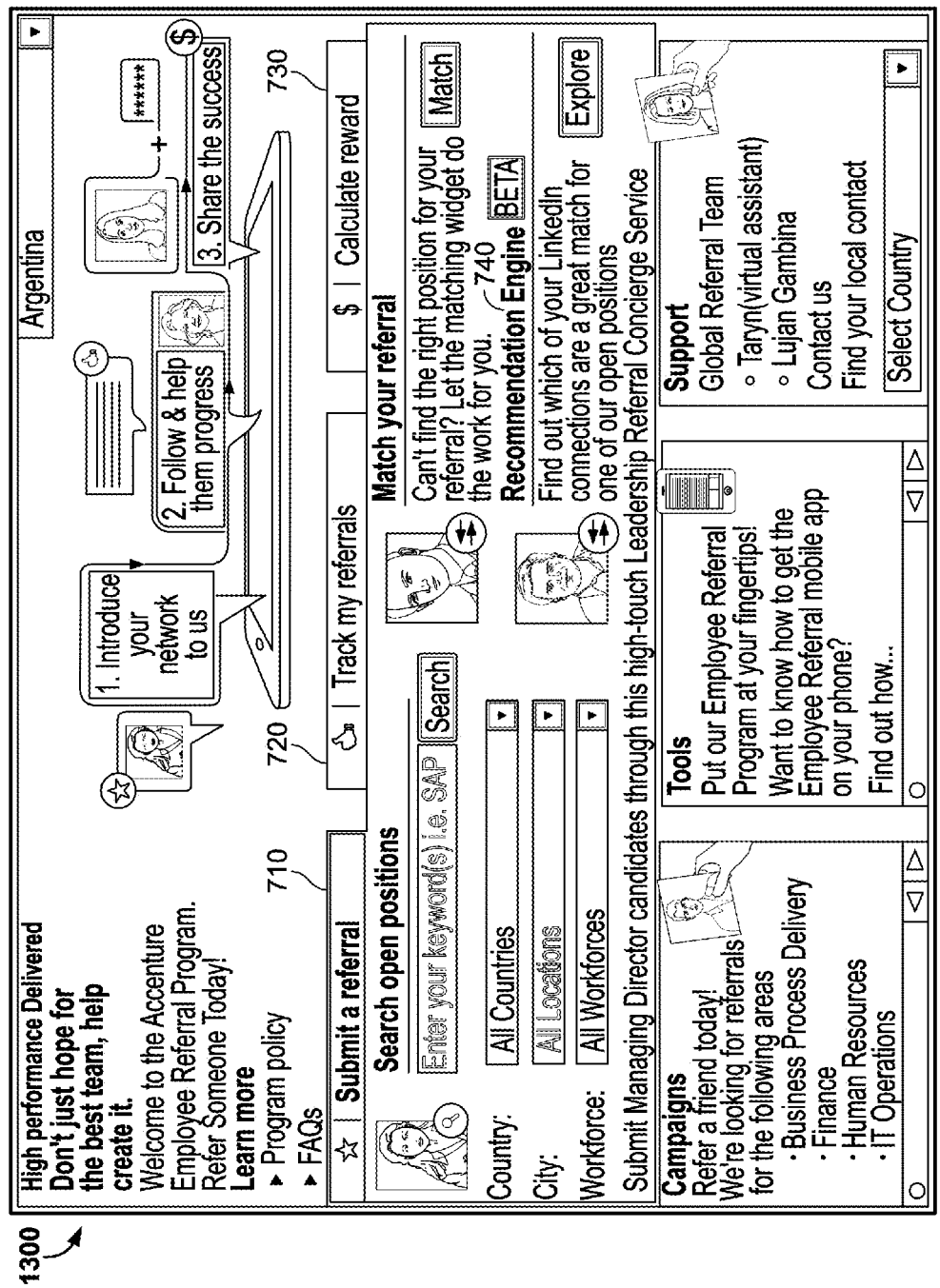
FIG. 7 illustrates an example of a home page for making a referral.

FIG. 7 illustrates an example of a home page 700 for making a referral. FIG. 7 shows an example of a home page design for providing the display in the user interface for tracking an employee referral. Three tabs are shown in FIG. 7: Submit a referral 710, Track my referrals 720 and Calculate reward 740. Links to support and recommended engine 740 such as linkedIn may also be displayed in the home page as shown in FIG. 7.

Figure 8:
FIG. 8 illustrates an example for showing job searching results in a grid view.

FIG. 8 illustrates an example for showing job searching results in a grid view 800. The employee referral may start with a job search. FIG. 8 illustrates a list of the job search result 820 after a key word 810 is entered. The search results displayed in FIG. 8 is in a grid view.

FIG. 9 shows an example for showing job searching results in a list view 900. More views may be available for the search results. FIG. 9 illustrates a list view of the job search result 910 after a key word 920 is entered. The user of the system may be able to set a preference or choose different views for the job search results.

Figure 10:
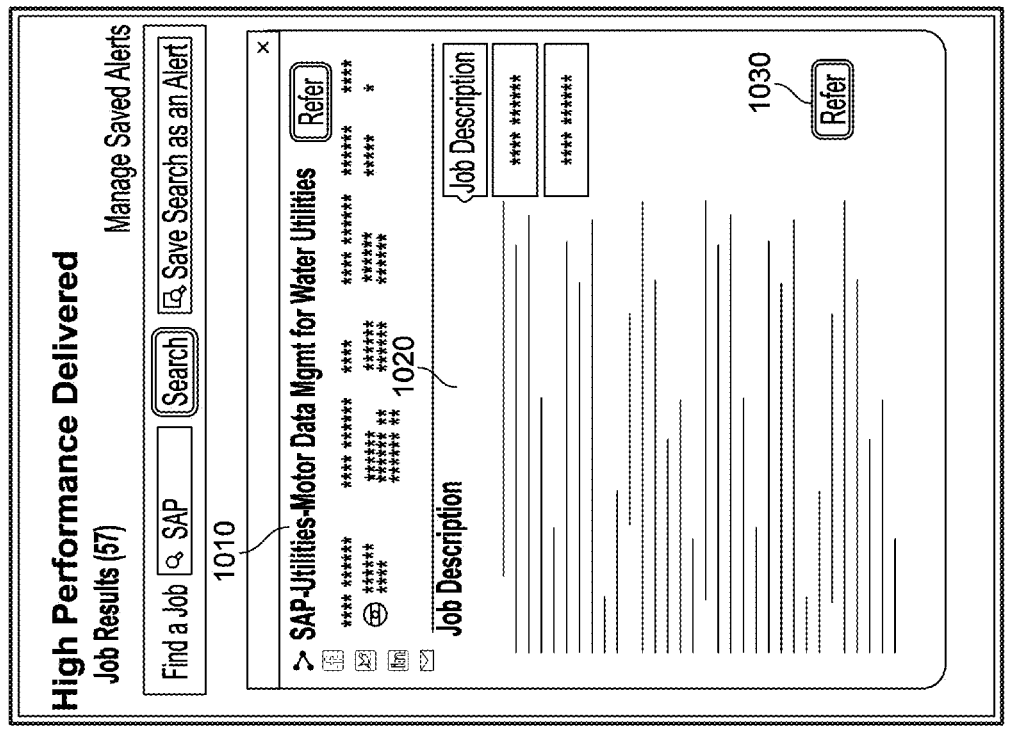
FIG. 10 illustrates an example of a webpage display for job description.

FIG. 10 illustrates an example of a webpage display for job description 1000. As illustrated in FIG. 10, the job title 1010 and and/or technical requirements for the job may be provided in the job description 1020. As shown in FIG. 10, the link or links such as a refer button 1030 to the employee referral webpage may be provided in the job description display page.

FIG. 11 shows an example of a referral homepage 1100 for displaying employee referral tracking information. As illustrated in FIG. 11. Two types of information may be required for the employee referral for a particular job opportunity 1106. The information for the employee 1102 who makes the referral and the information for the job candidate to be referred such as About You 1102 shown in FIG. 11. As shown in FIG. 11, the employee information 1102 may be pre-populated because the system may have the information stored in the data storage. The job candidate information such as about your referral 1104 may not be available initially. The employee may need to enter the job candidate information 1104 manually. As shown in FIG. 11, the user interface enables the employee to enter job candidate information manually. However, if the job candidate is available in the system, the job candidate information may also be pre-populated, either fully or partially.

As an example implementation, the employee information 1102 may be identified by peopleKey 436 in FIG. 4B. Also, the opportunity 1106 may be identified by requisitionId 432, and your referral 1104 may be identified by candidateId 434 at illustrated in FIG. 4B. The combination of peopleKey 436, requisitionId 432 and candidateId 434 may be used to identified an item authentication token.

Figure 12A:
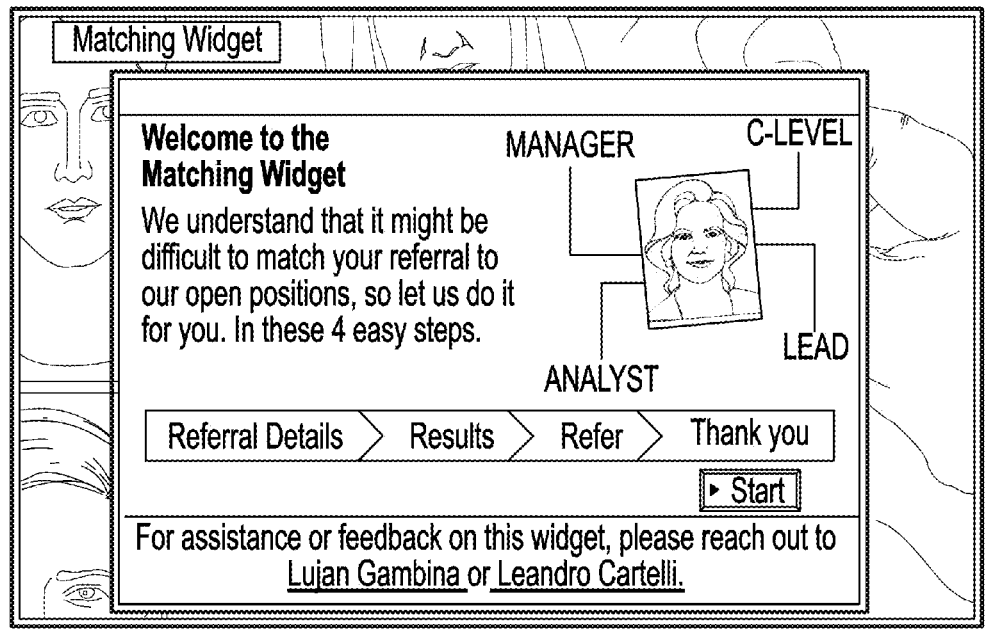
FIGS. 12A-12C show an example of matching widgets for displaying employee referral tracking information.
Figure 12B:
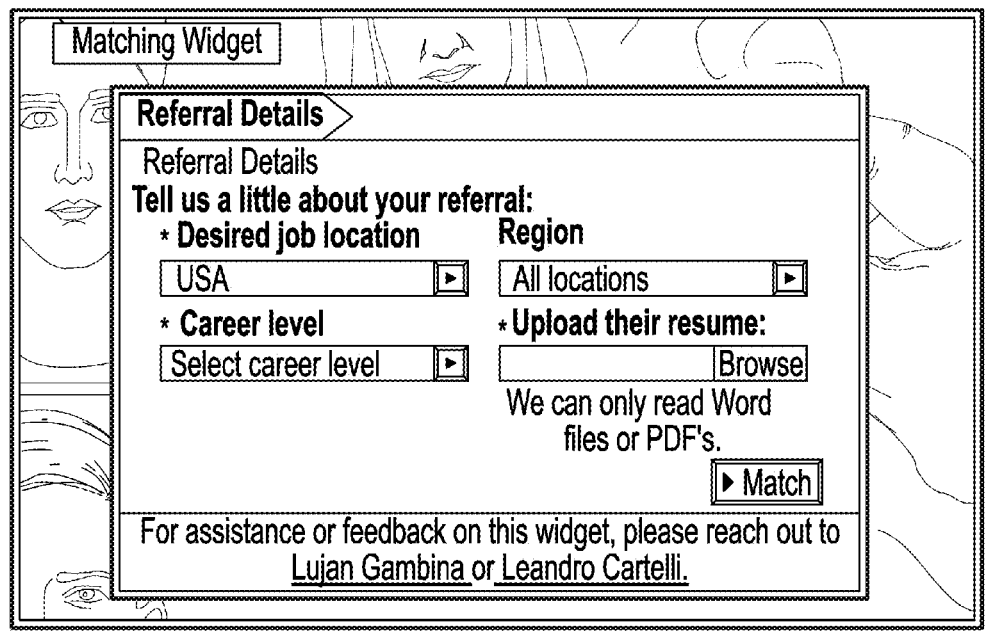
Figure 12C:
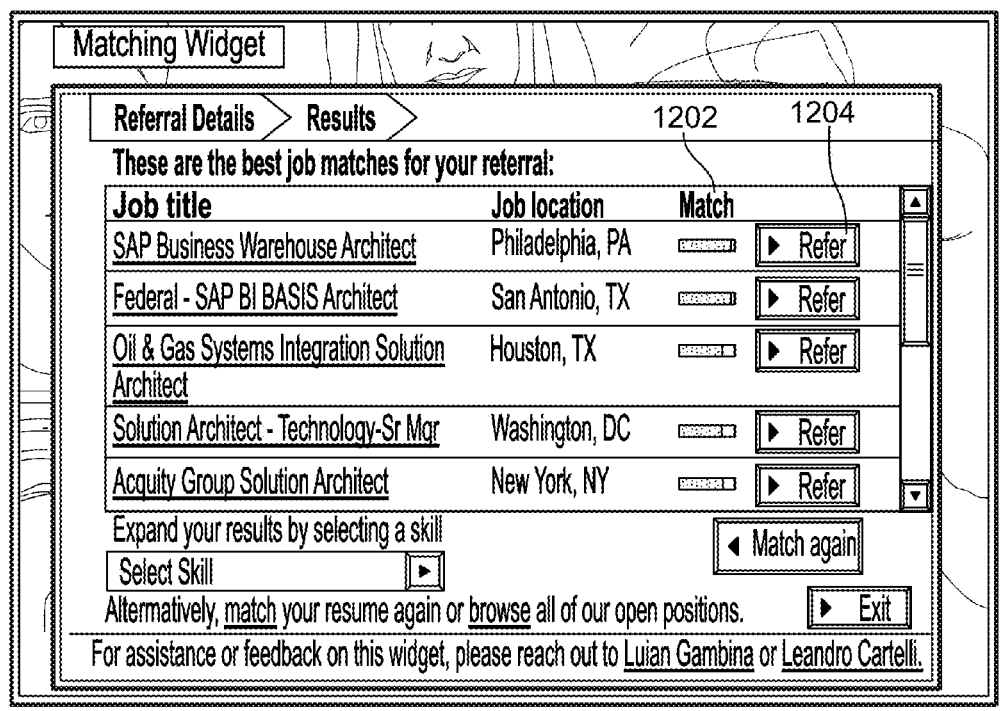

FIGS. 12A-12C show an example of matching widgets for displaying employee referral tracking information. As shown in FIG. 12C, the user interface may display whether a job candidate matches a certain job. The user interface may display a match bar 1202 to show the degree of the match between the job candidate and the job listed. As shown in FIG. 12C, the links to the employee referral website such as a refer button 1204 may be provided from the page of matching widgets.

Figure 13:
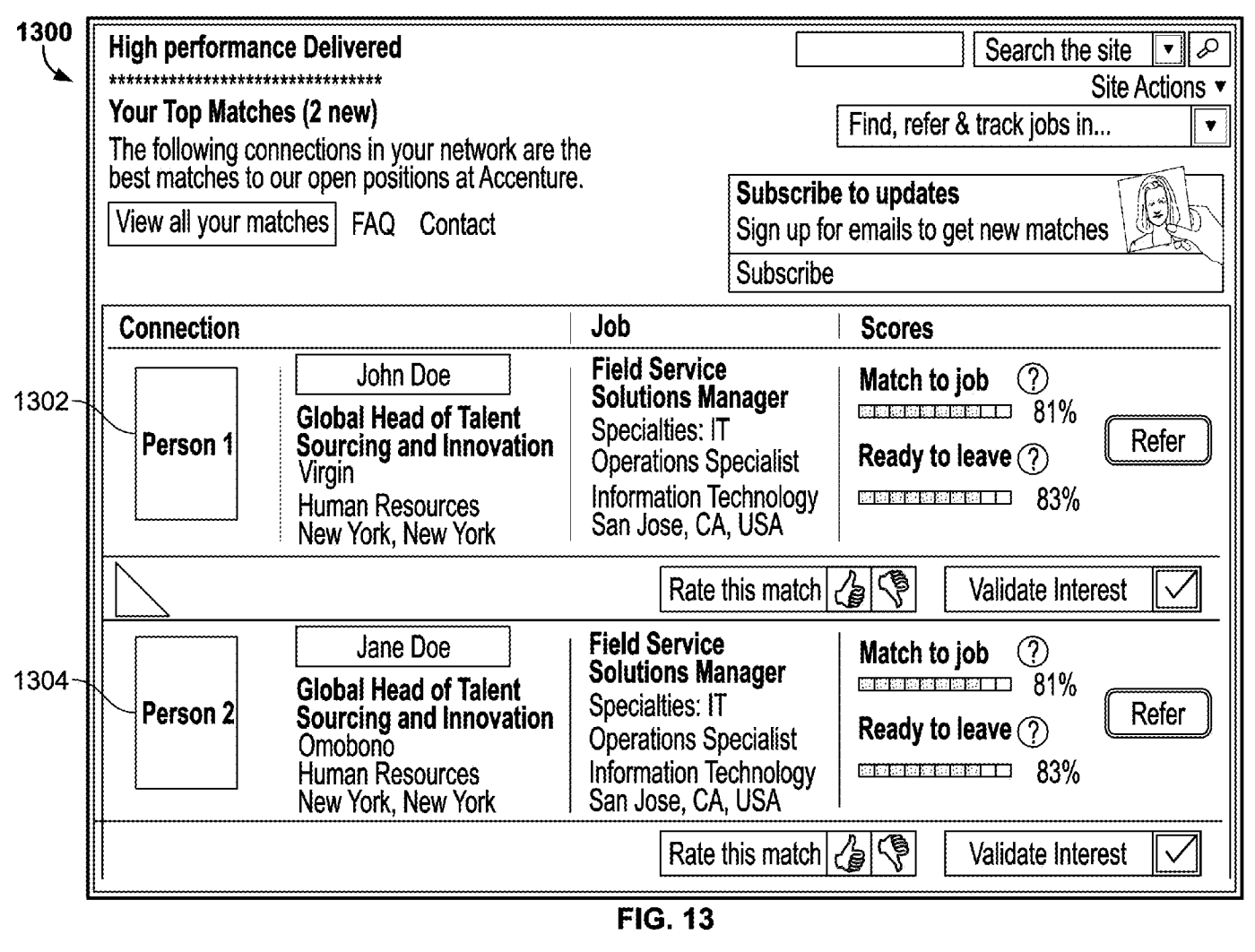

FIG. 13 shows an example of a referral recommendation engine 1300 for displaying employee referral tracking information. The user interface may also make recommendations to the employee to make referrals. As shown in FIG. 13. The user interface displays top two matches Person 1 1302 and Person 2 1204 between the job candidate and the job listed that the employee may choose to make the referral.

Figure 14B:
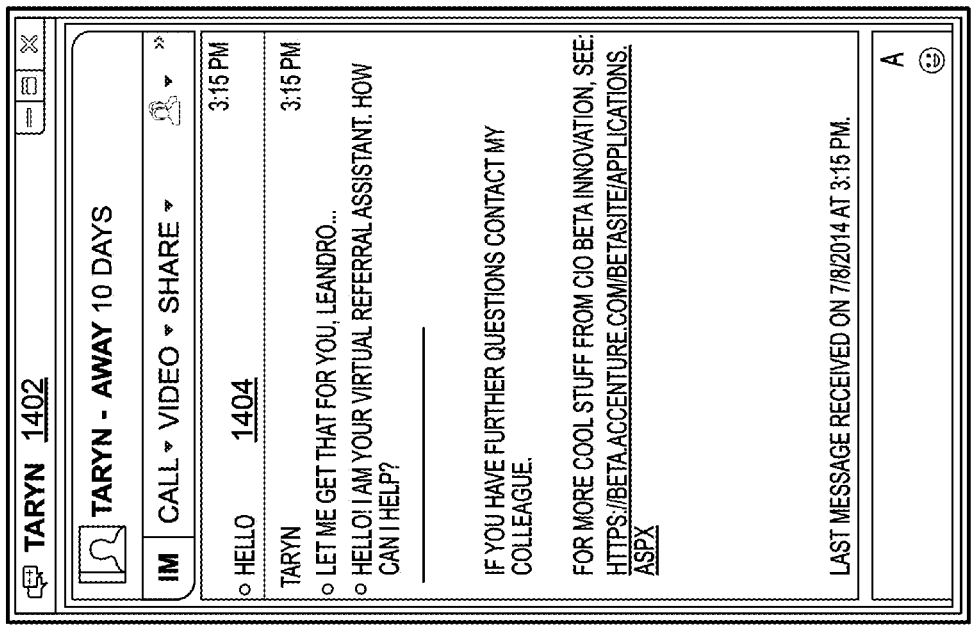
FIGS. 14A-14C show an automatic response system for displaying employee referral tracking information.
Figure 14A:
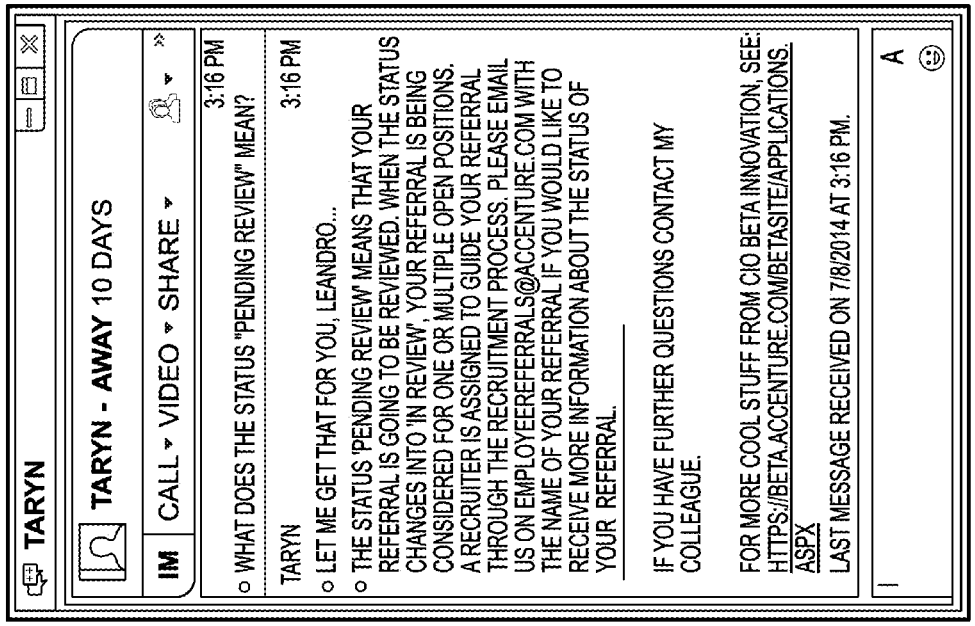
Figure 14C:
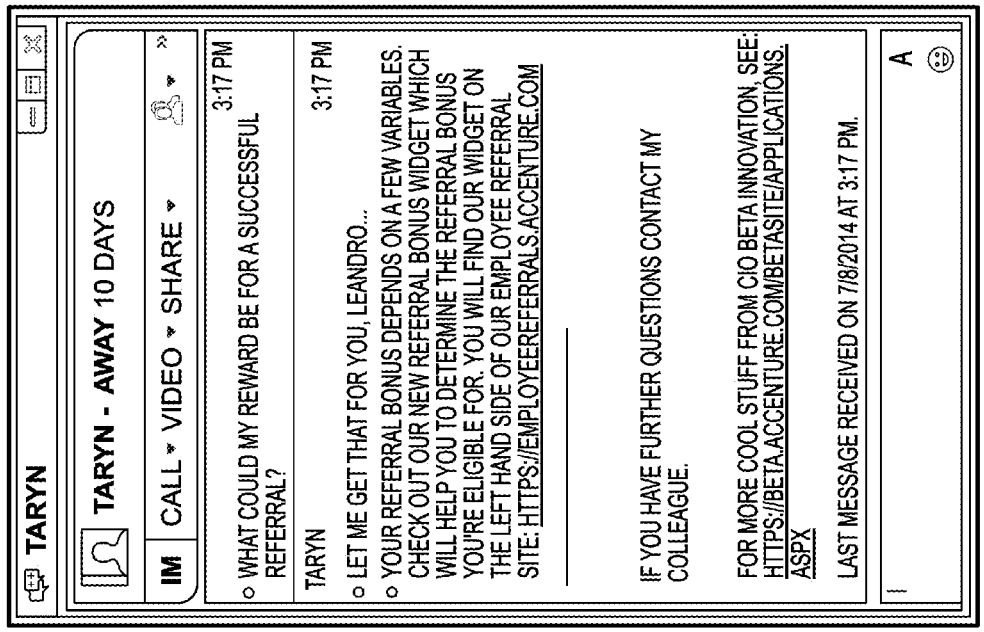

FIGS. 14A-14C show an automatic response system (virtual assistance) for displaying employee referral tracking information named Taryn. The user of the system may evoke a user support that is provided to mimic the live support by using an instant messing system. As shown in FIG. 14A, an instant messaging interface Taryn 1402 containing a dialog box may be provided for the user to enter questions. Virtual live support personnel named Taryn 1402 is provided as shown in FIG. 14A. The answers provided by Taryn 1404 of FIG. 14A may be provided to the user from the instant messaging interface. The answers may typically be generated and displayed automatically by the system. Also, the live support personnel (live assistance) may also be deployed to provide answers back to the user via the dialog box of the same instant messaging interface.

Figure 15:
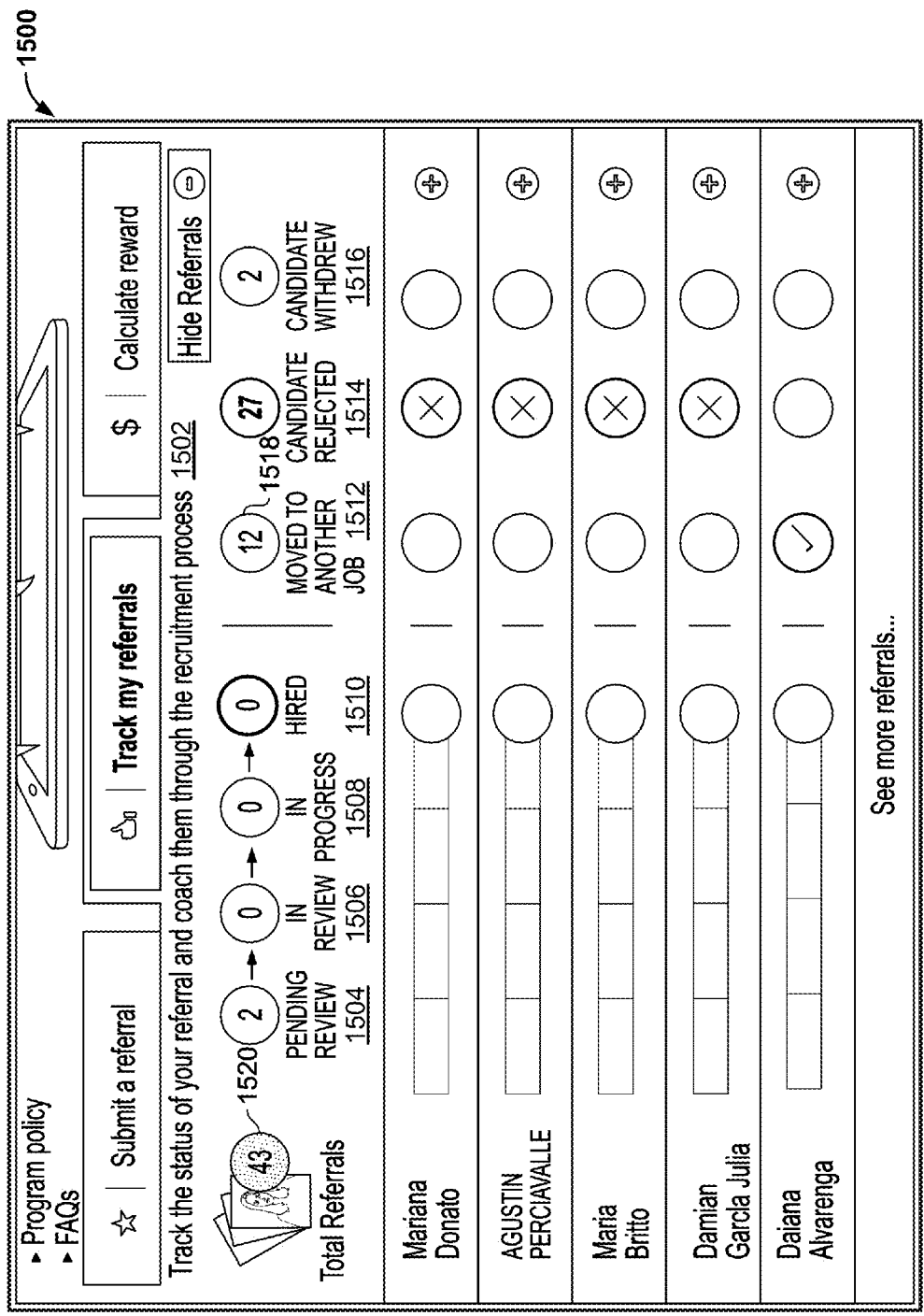
FIG. 15 illustrates an example of a webpage display to track employee referrals.

FIG. 15 illustrates an example of a webpage display 1500 to track employee referrals. Various statuses 1502 may show progress of the employee referral and may be displayed for the referral that the employee has made. As shown in FIG. 15, four statuses are provided to show the progress of the referral for each referred job candidate. For statuses include pending review 1504, in review 1506, in progresses 1508 and hired 1510. Also, other statuses associated with job candidates may also be shown. As in FIG. 15, moved to another job 1512, candidate rejected 1514 and candidate withdrew 1516 are shown. The number of referrals for each status may also be shown. For example, twelve referrals 1518 for move to another job status 1512 is shown in FIG. 15. In addition, the total referrals may be provided in the webpage display that is used for tracking statuses of employee referrals. For example, as shown in FIG. 15. The employee has made 43 referrals in total and is shown in total referrals 1520.

Figure 16:
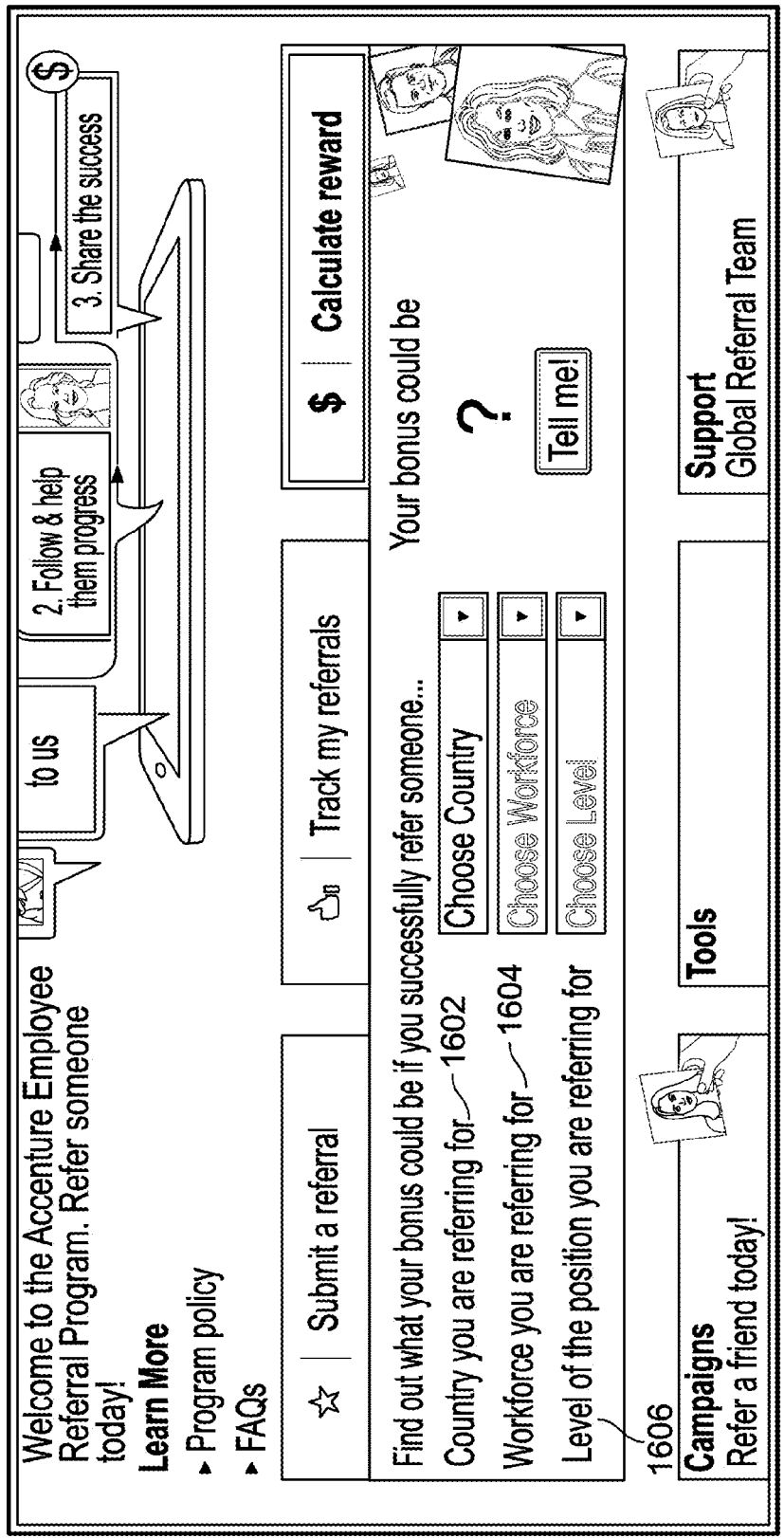
FIG. 16 illustrates an example of a webpage display for calculating reward.

FIG. 16 illustrates an example of a webpage display for calculating reward 1600. The reward may be calculated for each employee for the referrals he or she has made. As shown in FIG. 16, the calculation may be calculated based on the country of the referrals 1602, workforce of the referral 1604 and level of the position of the referrals 1606.

Figure 17:
FIG. 17 illustrates an example of a webpage display for campaigns, tools and support.

FIG. 17 illustrates an example of a webpage display for campaigns, tools and support 1700. The additional links for the employee referrals may also be displayed in the user interface. For example, as shown in FIG. 17, the links are provided for campaigns 1702 for referring veterans, tools 1704 for calculating the bonus that the employee may earn for making referrals, and support 1706 to access the virtual assistant that may be provided via instant message interface.

Additional examples provided in the present disclosure include additional business use case scenarios implementing the technical platforms described herein. The scenarios include:

A method may be provided for aggregating data to provide a display in a user interface for tracking an employee referral of a job candidate for an employer of an employee. The method may include the steps of populating data records in the data storage of a data management system where the data records are associated with the employee referral, retrieving and displaying a job list, selecting a job from the job list through the user interface, receiving an identification for the job candidate of the job from the employee and creating a referral record where a candidate profile for the job candidate is formed and is stored in the data storage.

Also, the method may further include: updating the data records stored in the data storage periodically at a pre-determined time interval by connecting with an external system. And, the method may include: retrieving the candidate profile, and displaying the candidate profile in the user interface of the user terminal, retrieving a status of the referral record where the status is one of a plurality predetermined statuses that indicate a progress of the employee referral, and displaying the status in the user interface.

Further, the method may include the steps of parsing a user's text inquiry and matching the parsed user's text inquiry with a pre-determined response associated with the employee referral and displaying the matched pre-determined response. The method may also include: determining an amount awarded to the employee according to the status of the referral record and aggregating data from displaying the candidate profile, displaying the status and determining the amount awarded.

The method may also include sub-steps. Some of sub-steps may include: assigning a display priority to each data element of the of the aggregated data; displaying a subset of data elements in the user interface within a single webpage according to the display priority and content size of the subset of data elements; and/or connecting a social media with the data management system and displaying a social media link in the user interface; and/or sending an automatic notification to the employee upon a change of the status for the referral record in the data storage.

The candidate profile disclosed in the method may be formed by either creating a new candidate profile or selecting an existing candidate profile that is stored in the data storage. The step of parsing the user's text inquiry disclosed in the method may include: determining context of the user's text inquiry, and when the context is determined to be unrelated to the employee referral, transmitting the pre-determined response to indicate that the user's text inquiry is improper. The step of displaying the matched pre-determined response disclosed in the method may include: displaying the matched pre-determined response in a second user interface on the user terminal wherein the second user interface is different from the user interface.

The present disclosure also provides a system for aggregating data to provide a display in a user interface for tracking an employee referral of a job candidate for an employer of an employee. The system may include a processor and a non-transitory computer readable medium storing computer instructions configured to cause the processor to: populate data records in the data storage of a data management system where the data records are associated with the employee referral, retrieve a job list from the data storage and displaying the job list in the user interface, select a job from the job, and in response to the selection, display a job description and an award for referring the selected job, and receive an identification for the job candidate of the job from the employee and create in the data storage a referral record containing a candidate profile for the job candidate.

The system may also include instructions to update the data records stored in the data storage periodically at a pre-determined time interval by connecting with an external system that stores and processes data associated with the hiring of the job candidate, including a status of the hiring of the job candidate, and retrieve the candidate profile from the data records stored in the data storage, and display the candidate profile in the user interface of a user terminal.

Further instructions included in the system to parse the user's text inquiry and match the parsed user's text inquiry with a pre-determined response associated with the employee referral may display the matched pre-determined response in response to receive a user selection of a link via the user interface and provide a text input field on the display for receiving a user's text inquiry.

The system may include instructions to determine an amount awarded to the employee according to the status of the referral record; and aggregate data from displaying the candidate profile, displaying the status and determining the amount awarded.

Further instructions included in the system may be executed that cause the system to: assign a display priority to each data element of the of the aggregated data; display a subset of data elements in the user interface within a single webpage according to the display priority and content size of the subset of data elements; and/or connect a social media with the data management system and display a social media in the user interface; and/or send an automatic notification to the employee upon a change of the status for the referral record in the data storage.

The candidate profile disclosed in the system may be formed by either creating a new candidate profile or selecting an existing candidate profile that is stored in the data storage.

The instructions that may cause the system to parse the user's text inquiry may further cause the system to determine context of the user's text inquiry, and when the context is determined to be unrelated to the employee referral, transmit the pre-determined response to indicate that the user's text inquiry is improper. The instructions that may cause the system to display the matched pre-determined response may further cause the system to display the matched pre-determined response in a second user interface on the user terminal wherein the second user interface is different from the user interface.

Also, the present disclosure provides a device as a user terminal for aggregating data to provide a display in a user interface for tracking an employee referral of a job candidate for an employer of an employee. The user terminal may include a user interface, and the user interface may be configured to receive a job list from a data storage and display the job list in the user interface where data records associated with the employee referral in the data storage of a data management system are populated, select a job from the job list through the user interface, and in response to the selection, display a job description and an award for referring the selected job, and receive an identification for the job candidate of the job from the employee and create in the data storage a referral record containing a candidate profile for the job candidate.

The user terminal may also be configured to receive the candidate profile where the data records are updated periodically at a pre-determined time interval by connecting with an external system that stores and processes data associated with the hiring of the job candidate, including a status of the hiring of the job candidate, and display the candidate profile in the user interface of a user terminal. Further, the user terminal may receive a status of the referral record from the data storage where the status is one of a plurality of pre-determined statuses that indicate a progress of the employee referral, and display the status in the user interface.

In response to receive a user selection of a link via the user interface. The user terminal may receive a text input field on the display for receiving a user's text inquiry, and display a matched pre-determined response when the user's text inquiry is parsed and the parsed user's text inquiry with a pre-determined response associated with the employee referral is matched. In addition, the user terminal may display an amount awarded to the employee according to the status of the referral record after the amount is determined, and display aggregated data for the candidate profile, the status and the amount awarded.

The device may further configured to display a subset of data elements in the user interface within a single webpage according to a display priority and content size of the subset of data elements after the display priority to each data element of the of the aggregated data is assigned; and/or connect a social media with the data management system and display a social media in the user interface; and/or transmit the pre-determined response to indicate that the user's text inquiry is improper when context of the user's text inquiry is determined to be unrelated to the employee referral; and/or display the matched pre-determined response in a second user interface on the user terminal. The candidate profile disclosed in the device may be formed by either creating a new candidate profile or selecting an existing candidate profile that is stored in the data storage.

Various campaigns for employee referrals may be designed and provided. For example, if the company has a big need for certain type jobs in a particular geographic area. The campaign may be designed to attract employees to make referrals for the type of jobs in the particular area according to the company's need. Additional bonus may be provided for the winner of the campaign.

Figure 18:
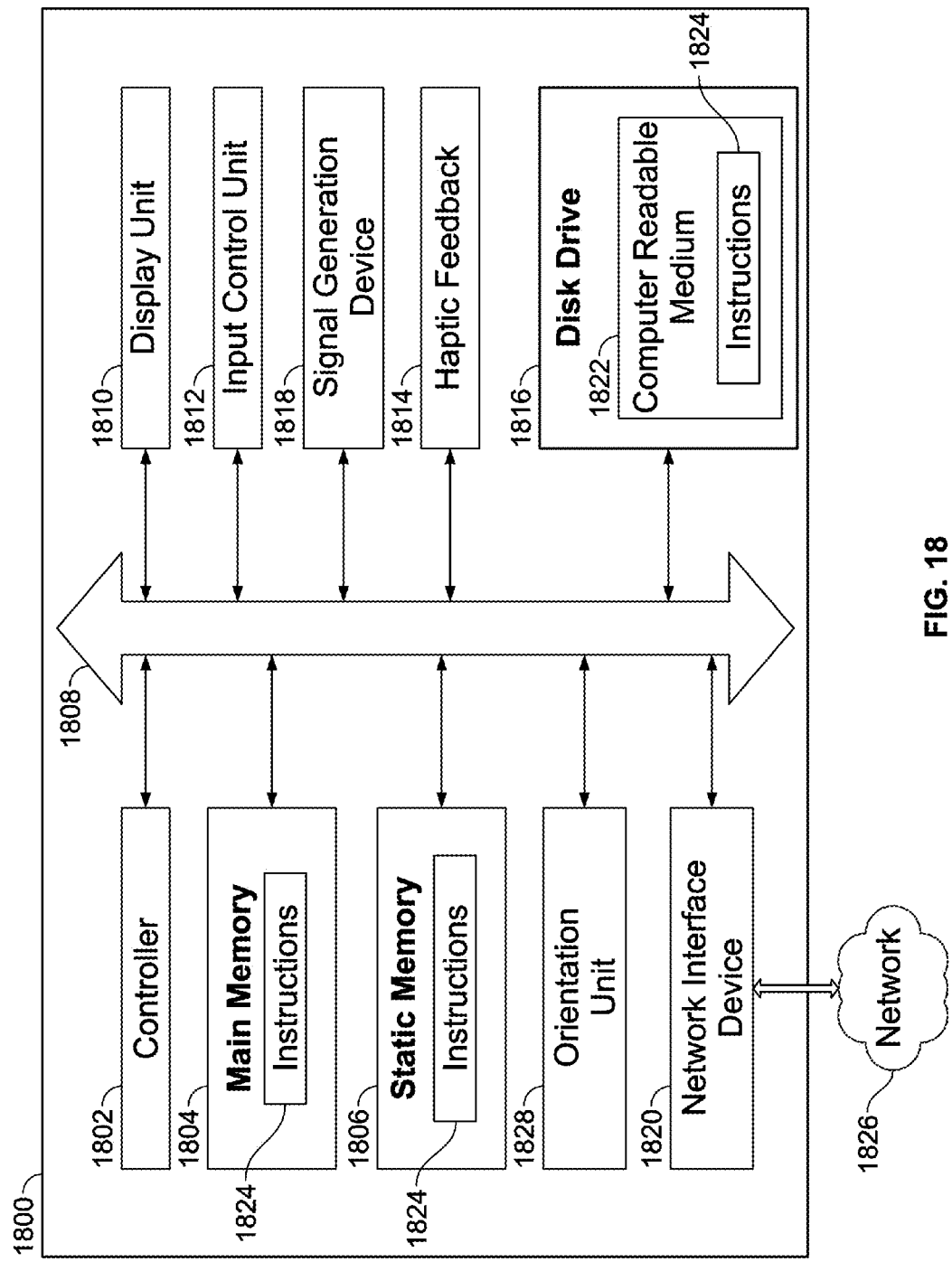
FIG. 18 illustrates an example of a computer system that may be used for providing a display for the employee referrals.

Referring to FIG. 18, an illustrative embodiment of a computer system that may be used for one or more of the components illustrated by the method, system and device in FIGS. 1-3, or in any other system configured to carry out the methods discussed in this disclosure herein, is shown and is designated 1800. Although the computer system 1800 is illustrated in FIG. 18 as including all of the components as illustrated, it is within the scope of this innovation for the computing system to be comprised of fewer, or more, components than just illustrated in FIG. 18.

The computer system 1800 can include a set of instructions 1824 that can be executed to cause the computer system 1800 to perform any one or more of the methods, processes or computer-based functions disclosed herein. For example, an interview tool as described herein may be a program comprised of a set of instructions 1824 that are executed by the controller 1802 to perform any one or more of the methods, processes or computer-based functions described herein. Such a program may be stored in whole, or in any combination of parts, on one or more of the exemplary memory components illustrated in FIG. 18, such as the main memory 1804, static memory 1806, or disk drive 1816.

As described, the computer system 1800 may be mobile device. The computer system 1800 may also be connected using a network 1818, to other computer systems or peripheral devices. In a networked deployment, the computer system 1800 may operate in the capacity of a server or as a client user computer in a server-client user network environment, or as a peer computer system in a peer-to-peer (or distributed) network environment. In addition to embodiments in which the computer system 1800 is implemented, the computer system 1800 may also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computer system 1800 can be implemented using electronic devices that provide voice, video or data communication. Further, while a single computer system 1800 is illustrated, the term "system" shall also be taken to include any collection of systems or sub-systems that individually or jointly execute a set, or multiple sets, of instructions to perform one or more computer functions.

As illustrated in FIG. 18, the computer system 1800 may include a controller 1802, such as a central processing unit ("CPU"), a graphics processing unit ("GPU"), or both. Moreover, the computer system 1800 can include a main memory 1804, and additionally may include a static memory 1806. In embodiments where more than one memory components are included in the computer system 1800, the memory components can communicate with each other via a bus 1808. As shown, the computer system 1800 may further include a display unit 1810, such as a liquid crystal display ("LCD"), an organic light emitting diode ("OLED"), a flat panel display, a solid state display, or a cathode ray tube ("CRT"). Additionally, the computer system 1800 may include one or more input devices 1812, such as a keyboard, push button(s), scroll wheel, digital camera for image capture and/or visual command recognition, touch screen, touchpad or audio input device (e.g., microphone). The computer system 1800 can also include signal outputting components such as a haptic feedback component 1814 and a signal generation device 1818 that may include a speaker or remote control.

Although not specifically illustrated, the computer system 1800 may additionally include a GPS (Global Positioning System) component for identifying a location of the computer system 1800.

Additionally, the computer system 1800 may include an orientation unit 1828 that includes any combination of one or more gyroscope(s) and accelerometer(s).

The computer system 1800 may also include a network interface device 1820 to allow the computer system 1800 to communicate via wireless, or wired, communication channels with other devices. The network interface device 1820 may be an interface for communicating with another computer system via a Wi-Fi connection, Bluetooth connection, Near Frequency Communication connection, telecommunications connection, internet connection, wired Ethernet connection, or the like. The computer system 1800 may also optionally include a disk drive unit 1816 for accepting a computer readable medium 1822. The computer readable medium 1822 may include a set of instructions that are executable by the controller 1802, and/or the computer readable medium 1822 may be utilized by the computer system 1800 as additional memory storage.

In a particular embodiment, as depicted in FIG. 18, the disk drive unit 1816 may include a computer-readable medium 1822 in which one or more sets of instructions 1824, such as software, can be embedded. Further, the instructions 1824 may embody one or more of the methods, processes, or logic as described herein. In a particular embodiment, the instructions 1824 may reside completely, or at least partially, within the main memory 1804, the static memory 1806, and/or within the controller 1802 during execution by the computer system 1800. The main memory 1804 and the controller 1802 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present computer system 1800 may encompass software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 1822 that includes instructions 1824 or receives and executes instructions 1824 responsive to a propagated signal; so that a device connected to a network 1818 can communicate voice, video or data over the network 1818. Further, the instructions 1824 may be transmitted or received over the network 1818 via the network interface device 1820.

While the computer-readable medium 1824 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium 1822 can include a solid-state memory such as a memory card or other package that houses one or more non-volatile read-only memories, such as flash memory. Further, the computer-readable medium 1822 can be a random access memory or other volatile re-writable memory. Additionally, the computer-readable medium 1822 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 1822 or a distribution medium and other equivalents and successor media, in which data or instructions may be stored. The computer readable medium may be either transitory or non-transitory.

Although the present specification describes components and functions that may be implemented in particular embodiments with reference to particular standards and protocols commonly used by financial institutions, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It is to be understood that, all examples provided above are merely some of the preferred examples of the present disclosure. For one skilled in the art, the present disclosure is intended to cover various modifications and equivalent arrangements included within the principle of the disclosure.

The invention claimed is:

1. A method for aggregating data to provide a display in a user interface, comprising:
   populating data records in a data storage of a data management system;
   authenticating a user for accessing the data records stored in the data management system;
   retrieving a list from the data records in the data storage and presenting for display the list in the user interface for the authenticated user;

receiving a selection of an item from the list through the user interface, and in response to the selection, presenting for display on the user interface an item attribute and an item figure for the selected item;

receiving, from the user interface, an item authentication token associating with the authenticated user for the selected item and creating in the data storage an object history record containing a plurality of attributes for the item authentication token;

updating the data records stored in the data storage in response to data modification events at an external system that stores and processes data associated with a plurality of statuses for the item authentication token including a result status for the item authentication token by connecting with the external system when the data modification events are of a volume lower than a predetermined reference volume, and updating the data records from the external system at a predetermined frequency when the data modification events are of a volume higher than the predetermined reference volume;

retrieving the plurality of attributes for the item authentication token from the data records stored in the data storage, and presenting for display the plurality of attributes in the user interface of a user terminal;

retrieving a progress status of the object history record from the data storage wherein the progress status is one of a plurality of pre-determined statuses that indicate a progress of the item authentication token for the selected item, and displaying the progress status in the user interface;

in response to receiving a user selection of a link via the user interface, providing a text input field on the display for receiving a user's text inquiry;

parsing the user's text inquiry and matching the parsed user's text inquiry with a predetermined response based on the item authentication token, retrieving the matched predetermined response from the data storage and providing for displaying the matched pre-determined response;

determining a numerical figure for the authenticated user according to the result status of the item authentication token and at least one of a geographic area and level of position associated with the item authentication token; and aggregating data from the data records in order for displaying the plurality of attributes, displaying the progress status and determining the numerical figure for the authenticated user.

2. The method of claim 1, further comprising:
assigning a display priority to each data element of the aggregated data; and
selecting and displaying a subset of data elements in the user interface within a single webpage according to the display priority and content size of the subset of data elements.

3. The method of claim 1, wherein the plurality of attributes for the item authentication token are formed by either creating a new object history record or selecting an existing object history record that is stored in the data storage.

4. The method of claim 1, further comprising:
connecting a social media with the data management system and displaying a social media link in the user interface.

5. The method of claim 1, wherein the parsing the user's text inquiry comprises:

determining context of the user's text inquiry, and when the context is determined to be unrelated to the item authentication token, transmitting the pre-determined response to indicate that the user's text inquiry is improper.

6. The method of claim 1, further comprising:
sending an automatic notification to the authenticated user upon a change of the progress status of the object history record in the data storage.

7. The method of claim 1, wherein the providing for displaying the matched pre-determined response comprises:
displaying the matched pre-determined response in a second user interface on the user terminal wherein the second user interface is different from the user interface.

8. The method of claim 1, wherein the predetermined frequency is adjustable according to a time of a fiscal year or the geographic area associated with the item authentication token.

9. A system for aggregating data to provide a display in a user interface, comprising: a processor and a non-transitory computer readable medium storing computer instructions configured to cause the processor to:

populate data records in data storage of a data management system;

authenticate a user for accessing the data records stored in the data management system;

retrieve a list from the data records in the data storage and present for display the list in the user interface for the authenticated user;

receive a selection of an item from the list through the user interface, and in response to the selection, present for display on the user interface an item attribute and an item figure for the selected item;

receive, from the user interface, an item authentication token associating with the authenticated user for the selected item and create in the data storage an object history record containing a plurality of attributes for the item authentication token;

update the data records stored in the data storage in response to data modification events at an external system that stores and processes data associated with a plurality of statuses for the item authentication token including a result status for the item authentication token by connecting with the external system when the data modification events are of a volume lower than a predetermined reference volume, and updating the data records from the external system at a predetermined frequency when the data modification events are of a volume higher than the predetermined reference volume;

retrieve the plurality of attributes for the item authentication token from the data records stored in the data storage, and present for display the plurality of attributes in the user interface of a user terminal;

retrieve a progress status of the object history record from the data storage wherein the progress status is one of a plurality of pre-determined statuses that indicate a progress of the item authentication token for the selected item, and display the progress status in the user interface;

in response to receive a user selection of a link via the user interface, provide a text input field on the display for receiving a user's text inquiry;

parse the user's text inquiry and match the parsed user's text inquiry with a pre-determined response based on the item authentication token, retrieving the matched predetermined response from the data storage and provide for displaying the matched pre-determined response;

determine a numerical figure for the authenticated user according to the result status of the item authentication token and at least one of a geographic area and level of position associated with the item authentication token; and aggregate data from the data records in order for displaying the plurality of attributes, displaying the progress status and determining the numerical figure for the authenticated user.

10. The system of claim 9, further comprising the instructions when executed cause the processors to:

assign a display priority to each data element of the aggregated data; and select and display a subset of data elements in the user interface within a single webpage according to the display priority and content size of the subset of data elements.

11. The system of claim 9, wherein the plurality of attributes for the item authentication token are formed by either creating a new object history record or selecting an existing object history record that is stored in the data storage.

12. The system of claim 9, further comprising the instructions when executed cause the processor to:

connect a social media with the data management system and display a social media in the user interface.

13. The system of claim 9, wherein the instructions when executed cause the processor to parse the user's text inquiry comprises instructions to:

determine context of the user's text inquiry, and when the context is determined to be unrelated to the item authentication token, transmit the pre-determined response to indicate that the user's text inquiry is improper.

14. The system of claim 9, further comprising the instructions when executed cause the processor to:

send an automatic notification to the authenticated user upon a change of the progress status of the object history record in the data storage.

15. The system of claim 9, wherein the instructions to display the matched pre-determined response comprises instructions when executed cause the processor to:

display the matched pre-determined response in a second user interface on the user terminal wherein the second user interface is different from the user interface.

16. A user terminal for displaying aggregated data, comprising a memory storing instructions; and a processor in communication with the memory, wherein the processor, when executing the instructions, is configured to implement a user interface; wherein the user interface is configured to:

authenticate a user for accessing data records in data storage stored in a data management system;

receive a list from the data storage and display the list in the user interface wherein the data records associated with an item authentication token in the data storage of the data management system are populated;

select an item from the list through the user interface, and in response to the selection, display an item attribute and an item figure for the selected item;

receive, from the user interface, the item authentication token associating with the authenticated user for the selected item and create in the data storage an object history record containing a plurality of attributes for the item authentication token;

receive the plurality of attributes for the item authentication token from the data records stored in the data storage wherein (i) the data records are updated in response to data modification events at an external system that stores and processes data associated with a plurality of statuses for the item authentication token including a result status of the item authentication token by connecting with the external system when the data modification events are of a volume lower than a predetermined reference volume, and (ii) the data records are updated from the external system at a predetermined frequency when the data modification events are of a volume higher than the predetermined reference volume;

present for displaying the plurality of attributes in the user interface of a user terminal;

receive a progress status of the object history record from the data storage wherein the progress status is one of a plurality of pre-determined statuses that indicate a progress of the item authentication token for the selected item, and displaying the progress status in the user interface;

in response to receive a user selection of a link via the user interface, receive a text input field on the display for receiving a user's text inquiry;

provide for displaying a matched pre-determined response, when the user's text inquiry is parsed and the parsed user's text inquiry with the pre-determined response based on the item authentication token is matched and is retrieved from the data storage;

display a numerical figure for the authenticated user according to the result status of the item authentication token and at least one of a geographic area and level of position associated with the item authentication token after the numerical figure is determined; and display aggregated data from the data records in order for displaying the plurality of attributes, displaying the progress status and displaying the numerical figure for the authenticated user.

17. The user terminal of claim 16, wherein the user interface is further configured to:

select and display a subset of data elements in the user interface within a single webpage according to a display priority and content size of the subset of data elements after the display priority to each data element of the of the aggregated data is assigned.

18. The user terminal of claim 16, wherein the plurality of attributes for the item authentication token are formed by either creating a new object history record or selecting an existing object history record that is stored in the data storage.

19. The user terminal of claim 16, wherein the user interface is further configured to:

connect a social media with the data management system and display a social media in the user interface.

20. The user terminal of claim 16, wherein the user interface is further configured to:

transmit the pre-determined response to indicate that the user's text inquiry is improper when context of the user's text inquiry is determined to be unrelated to the item authentication token.

* * * * *